US012174574B2

(12) United States Patent
Suzuki et al.

(10) Patent No.: US 12,174,574 B2
(45) Date of Patent: Dec. 24, 2024

(54) DETECTION DEVICE AND IMAGE FORMING APPARATUS

(71) Applicant: FUJIFILM Business Innovation Corp., Tokyo (JP)

(72) Inventors: Hiroyuki Suzuki, Ebina (JP); Naohito Otsuki, Ebina (JP); Takehiko Koizumi, Ebina (JP); Yuta Chino, Ebina (JP)

(73) Assignee: FUJIFILM BUSINESS INNOVATION CORP., Tokyo (JP)

( * ) Notice: Subject to any disclaimer, the term of this patent is extended or adjusted under 35 U.S.C. 154(b) by 0 days.

(21) Appl. No.: 18/314,906

(22) Filed: May 10, 2023

(65) Prior Publication Data

US 2023/0273564 A1 Aug. 31, 2023

Related U.S. Application Data

(63) Continuation of application No. PCT/JP2021/026026, filed on Jul. 9, 2021.

(30) Foreign Application Priority Data

Feb. 22, 2021 (JP) ................................ 2021-026193

(51) Int. Cl.
*G03G 15/00* (2006.01)

(52) U.S. Cl.
CPC .................. *G03G 15/6579* (2013.01); *G03G 2215/00451* (2013.01); *G03G 2215/0054* (2013.01);

(Continued)

(58) Field of Classification Search
CPC ............ G03G 15/234; G03G 15/6567; G03G 15/6579; G03G 2215/00451;

(Continued)

(56) References Cited

U.S. PATENT DOCUMENTS 4,926,219 A * 5/1990 Hirasawa ............ G03G 15/165 399/113
5,848,344 A * 12/1998 Milillo .............. G03G 15/6564 356/429

(Continued)

FOREIGN PATENT DOCUMENTS

JP 2007-322917 A 12/2007
JP 4133702 B2 8/2008

(Continued)

OTHER PUBLICATIONS

Aug. 10, 2021 International Search Report issued in International Patent Application No. PCT/JP2021/026026.

(Continued)

*Primary Examiner* — Justin N Olamit
(74) *Attorney, Agent, or Firm* — Oliff PLC

(57) ABSTRACT

A detection device includes: a transport unit that stops transportation of a medium on which a first image is formed, the transport unit restarting the transportation of the medium toward an image forming unit after the medium has been in a stopped state, the image forming unit forming a second image on the medium; and a detection unit that detects an edge portion of the medium while the medium is in the stopped state.

20 Claims, 15 Drawing Sheets

(52) U.S. Cl.
CPC ............. *G03G 2215/00616* (2013.01); *G03G 2215/00679* (2013.01); *G03G 2215/00721* (2013.01)

(58) Field of Classification Search
CPC . G03G 2215/0054; G03G 2215/00616; G03G 2215/00679; G03G 2215/00721
See application file for complete search history.

(56) References Cited

U.S. PATENT DOCUMENTS

| | | | | |
|---|---|---|---|---|
| 7,848,696 | B2 * | 12/2010 | Peng .................. | G03G 15/5062<br>271/226 |
| 8,107,873 | B2 * | 1/2012 | Nakazawa ......... | G03G 15/6564<br>399/394 |
| 8,219,000 | B2 * | 7/2012 | Kuma ................ | G03G 15/1685<br>399/121 |
| 2007/0280764 | A1 | 12/2007 | Nakazawa et al. | |
| 2012/0075681 | A1 * | 3/2012 | Inoue ................. | G03G 15/6561<br>358/498 |
| 2018/0341212 | A1 * | 11/2018 | Shiokawa .......... | G03G 15/6564 |
| 2021/0373477 | A1 * | 12/2021 | Yoshida ............. | G03G 15/6567 |

FOREIGN PATENT DOCUMENTS

| | | |
|---|---|---|
| JP | 2012-237892 A | 12/2012 |
| JP | 2017-114659 A | 6/2017 |

OTHER PUBLICATIONS

Aug. 10, 2021 Written Opinion of the International Searching Authority issued in International Patent Application No. PCT/JP2021/026026.

Jul. 30, 2024 Office Action issued in Japanese Patent Application No. 2021-026193.

Jun. 15, 2024 Office Action issued in Australian Patent Application No. 2021428773.

Aug. 12, 2024 Extended European Search Report issued in European Patent Application No. 21926656.6.

Sep. 21, 2024 Office Action issued in Australian Patent Application No. 2021428773.

* cited by examiner

DETECTION DEVICE AND IMAGE FORMING APPARATUS

CROSS-REFERENCE TO RELATED APPLICATIONS

This is a continuation of International Application No. PCT/JP2021/026026 filed on Jul. 9, 2021, and claims priority from Japanese Patent Application No. 2021-026193 filed on Feb. 22, 2021.

BACKGROUND

(i) Technical Field

The present disclosure relates to a detection device and an image forming apparatus.

(ii) Related Art

Japanese Patent No. 4133702 discloses an image forming apparatus including an image forming unit that forms an image, a sheet reversing unit used to perform double-sided printing, a guide unit used to retain the position of a paper sheet in the sheet reversing unit, and a sheet-position retaining unit. A paper sheet whose length in a transporting direction thereof is longer than the length of a transport passage in the sheet reversing unit may be transported into the transport passage. In such a case, the sheet-position retaining unit continuously retains the position of the paper sheet with the guide unit from when the paper sheet has entirely entered the transport passage and when the transportation of the paper sheet is stopped so that a trailing edge of the paper sheet is at a reversing start position. Then, when the next image forming operation is ready to be started, the sheet-position retaining unit stops retaining the position of the paper sheet and releases the paper sheet.

Japanese Unexamined Patent Application Publication No. 2017-114659 discloses a sheet-length measurement device including a rotating body that rotates in contact with a sheet material, a measurement mechanism that measures an amount of rotation of the rotating body, and position sensing mechanisms disposed upstream and downstream of the rotating body in a transporting direction of the sheet material. Each of the position sensing mechanisms includes a sensing member line including plural sensing members arranged in a line. Each position sensing mechanism is disposed to cross side edges of the sheet material in a width direction, and is at an angle with respect to the transporting direction of the sheet material. A sheet length of the sheet material is determined based on the amount of rotation of the rotating body measured by the measurement mechanism and positions of edge portions of the sheet material sensed by the position sensing mechanisms.

SUMMARY

When a detection unit including a sensor detects an edge portion of a medium transported by a transport member, such as a transport roller, the orientation of the medium easily varies because the medium is moved, and there is a possibility that the edge portion of the medium cannot be accurately detected.

Aspects of non-limiting embodiments of the present disclosure relate to detection of an edge portion of a medium with higher accurately compared to when the edge portion of the medium is detected while the medium is being transported.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided a detection device including: a transport unit that stops transportation of a medium on which a first image is formed, the transport unit restarting the transportation of the medium toward an image forming unit after the medium has been in a stopped state, the image forming unit forming a second image on the medium; and a detection unit that detects an edge portion of the medium while the medium is in the stopped state.

BRIEF DESCRIPTION OF THE DRAWINGS

An exemplary embodiment of the present disclosure will be described in detail based on the following figures, wherein.

DETAILED DESCRIPTION

An exemplary embodiment of the present disclosure will now be described with reference to the drawings.

Image Forming Apparatus 10

Figure 1:
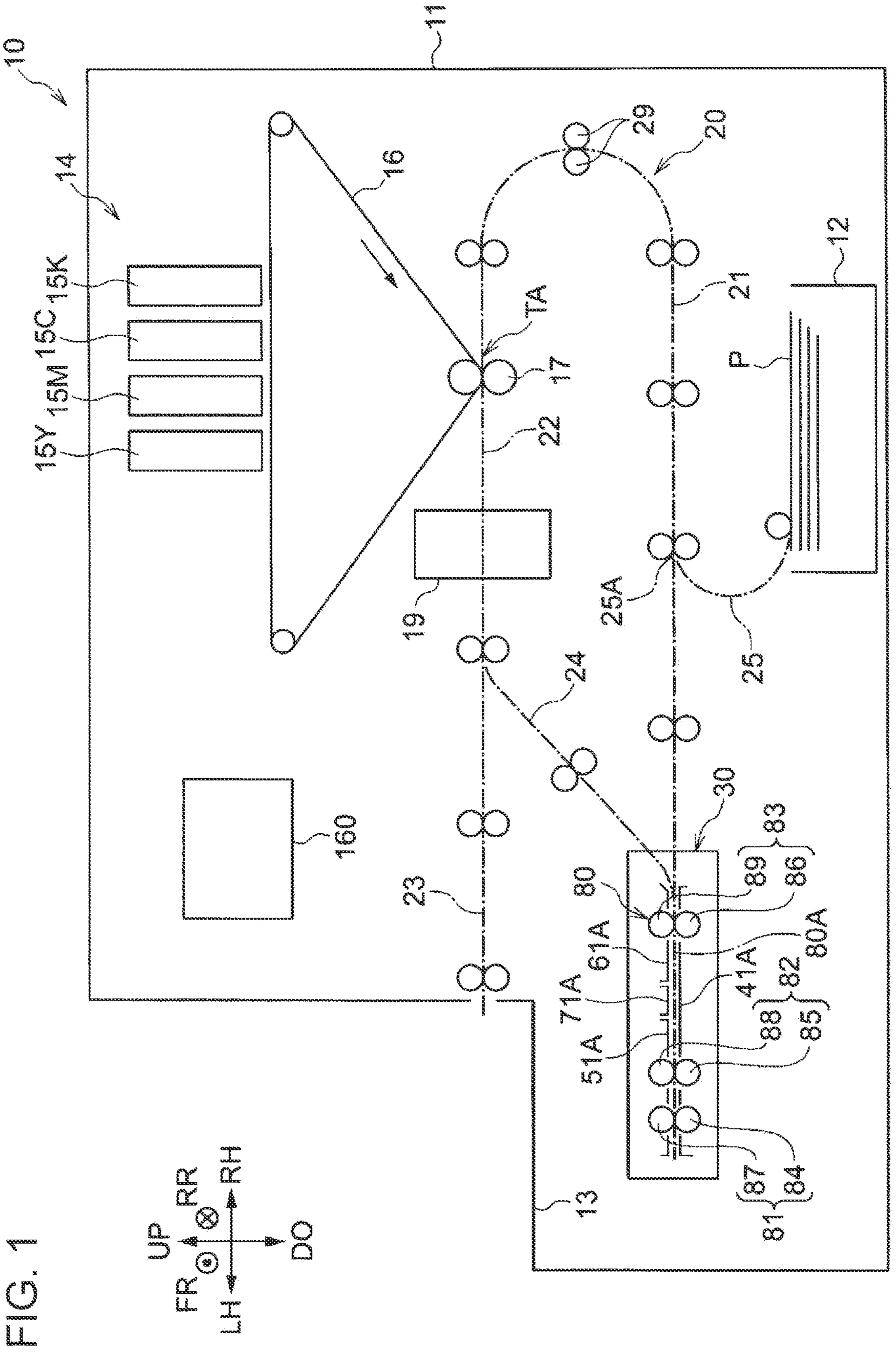
FIG. 1 is a schematic diagram illustrating the structure of an image forming apparatus according to an exemplary embodiment.

The structure of an image forming apparatus 10 according to the exemplary embodiment will be described. FIG. 1 is a schematic diagram illustrating the structure of the image forming apparatus 10 according to the present exemplary embodiment.

In the drawings, arrow UP shows an upward (vertically upward) direction of the apparatus, and arrow DO shows a downward (vertically downward) direction of the apparatus. In addition, arrow LH shows a leftward direction of the apparatus, and arrow RH shows a rightward direction of the apparatus. In addition, arrow FR shows a forward direction of the apparatus, and arrow RR shows a rearward direction of the apparatus. These directions are defined for convenience of description, and are not intended to limit the structure of the apparatus. The directions of the apparatus may be referred to without the term "apparatus". For example, the "upward direction of the apparatus" may be referred to simply as the "upward direction".

In addition, in the following description, the term "up-down direction" may be used to mean either "both upward and downward directions" or "one of the upward and downward directions". The term "left-right direction" may be used to mean either "both leftward and rightward directions" or "one of the leftward and rightward directions". The left-right direction may also be referred to as a lateral direction or a horizontal direction. The term "front-rear direction" may be used to mean either "both forward and rearward directions" or "one of the forward and rearward directions". The front-rear direction corresponds to a width direction described below, and may also be referred to as a lateral direction or a horizontal direction. The up-down direction, the left-right direction, and the front-rear direction cross each other (more specifically, are orthogonal to each other).

In the figures, a circle with an X in the middle represents an arrow going into the page. A circle with a dot in the middle represents an arrow coming out of the page.

The image forming apparatus 10 illustrated in FIG. 1 is an apparatus that forms an image. More specifically, the image forming apparatus 10 is an inkjet image forming apparatus that forms an image on a medium P by using ink. Still more specifically, as illustrated in FIG. 1, the image forming apparatus 10 includes an image forming apparatus body 11, a medium storage unit 12, a medium output unit 13, an image forming unit 14, a heating unit 19, a transport mechanism 20, and a detection device 30.

The image forming apparatus 10 is an example of an "apparatus in which the detection device 30 is disposed". The medium P, components of the image forming apparatus 10, an image forming operation performed by the image forming apparatus 10, etc., will now be described.

Medium P

The medium P is an object on which an image is formed by the image forming unit 14. The medium P may be, for example, a paper sheet or a film. The paper sheet may be, for example, a sheet of cardboard paper or coated paper. The film may be, for example, a resin film or a metal film. In the present exemplary embodiment, a paper sheet, for example, is used as the medium P. The type of the medium P is not limited to the above-described types, and various types of media P may be used.

The size of the medium P may be, for example, greater than A3, and sizes such as A2, A1, A0, and B series may be used. The size of the medium P is not limited to the above-described sizes, and media P having various sizes may be used.

A dimension of the medium P in a transporting direction will be referred to as a transporting-direction dimension. A direction that crosses (more specifically, that is orthogonal to) the transporting direction of the medium P will be referred to as a width direction, and a dimension of the medium P in the width direction will be referred to as a width-direction dimension. The transporting-direction dimension and the width-direction dimension of the medium P are examples of a "dimension of the medium P". Examples of the "dimension of the medium P" also include a dimension in a direction crossing the transporting direction at an angle.

Image Forming Apparatus Body 11

As illustrated in FIG. 1, components of the image forming apparatus 10 are disposed in the image forming apparatus body 11. More specifically, for example, the medium storage unit 12, the image forming unit 14, the heating unit 19, the transport mechanism 20, and the detection device 30 are disposed in the image forming apparatus body 11.

Figure 16:
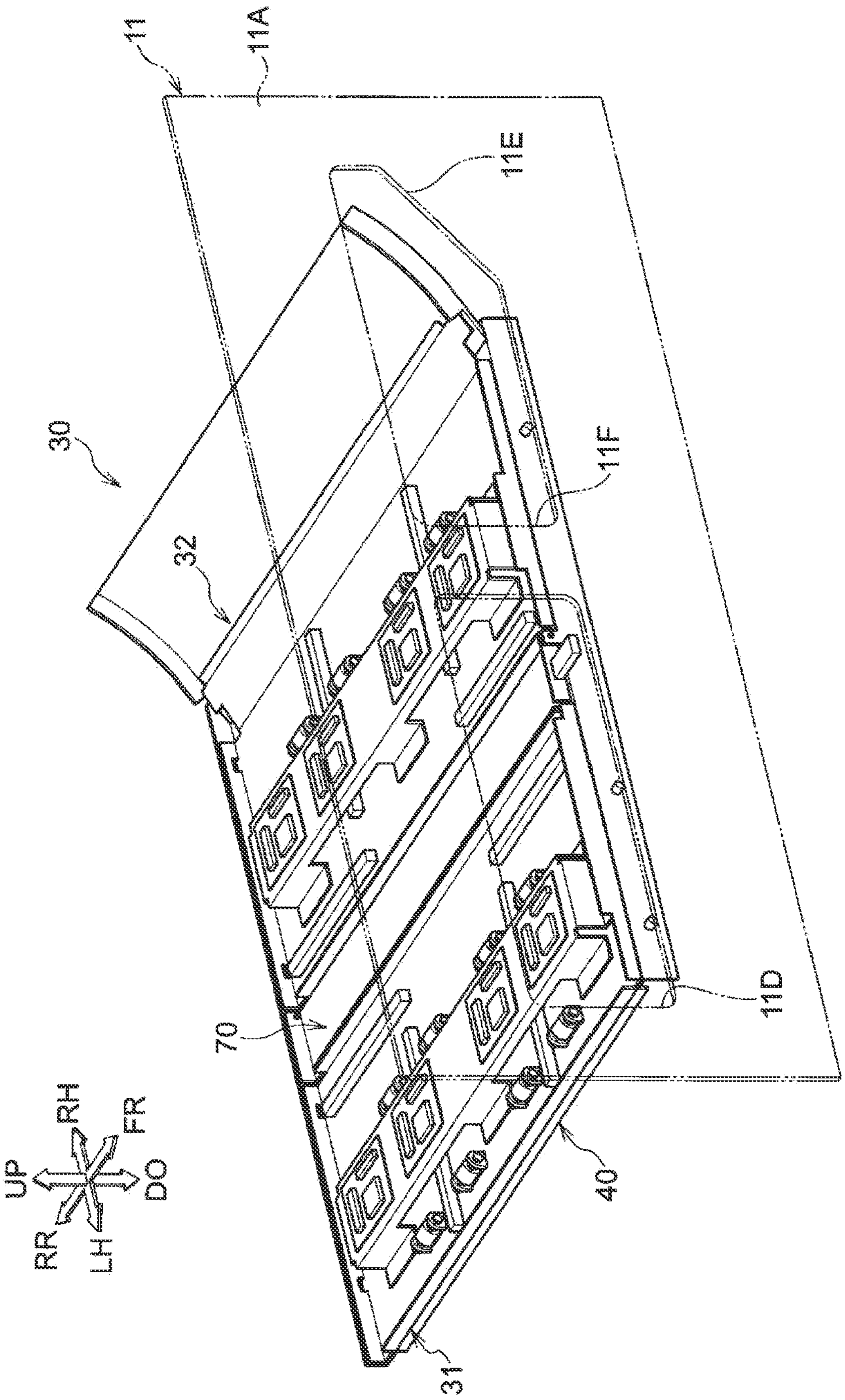
FIG. 16 is a perspective view illustrating the structure of a frame disposed in front of the detection device according to the exemplary embodiment.

As illustrated in FIG. 16, the image forming apparatus body 11 includes a frame 11A that serves as a front wall disposed in front of the detection device 30. The image forming apparatus body 11 allows removal of the detection device 30 disposed therein. In other words, the detection device 30 is removably attached to the image forming apparatus body 11. The position and removal of the detection device 30 will be described below.

Medium Storage Unit 12

The medium storage unit 12 is a unit that stores media P in the image forming apparatus 10. The media P stored in the medium storage unit 12 are supplied to the image forming unit 14.

Medium Output Unit 13

The medium output unit 13 is a unit of the image forming apparatus 10 to which each medium P is output. The medium output unit 13 receives the medium P on which an image has been formed by the image forming unit 14.

Image Forming Unit 14

The image forming unit 14 illustrated in FIG. 1 is an example of an image forming unit that forms an image on the medium P. The image forming unit 14 forms an image on the medium P by using ink. More specifically, as illustrated in FIG. 1, the image forming unit 14 includes discharge portions 15Y, 15M, 15C, and 15K (hereinafter denoted by 15Y to 15K), a transfer body 16, and a facing member 17 that faces the transfer body 16.

In the image forming unit 14, the discharge portions 15Y to 15K discharge ink droplets of respective colors, which are yellow (Y), magenta (M), cyan (C), and black (K), toward the transfer body 16 to form images on the transfer body 16. In addition, in the image forming unit 14, the images of respective colors formed on the transfer body 16 are transferred to the medium P that passes through a transfer position TA between the transfer body 16 and the facing member 17. As a result, an image is formed on the medium P. The transfer position TA may be regarded as an image formation position at which the image is formed on the medium P.

An example of the image forming unit does not necessarily have the structure of the image forming unit 14. For example, an example of the image forming unit may be structured such that the discharge portions 15Y to 15K discharge ink droplets directly toward the medium P instead of the transfer body 16.

Image Forming Unit 214

Figure 2:
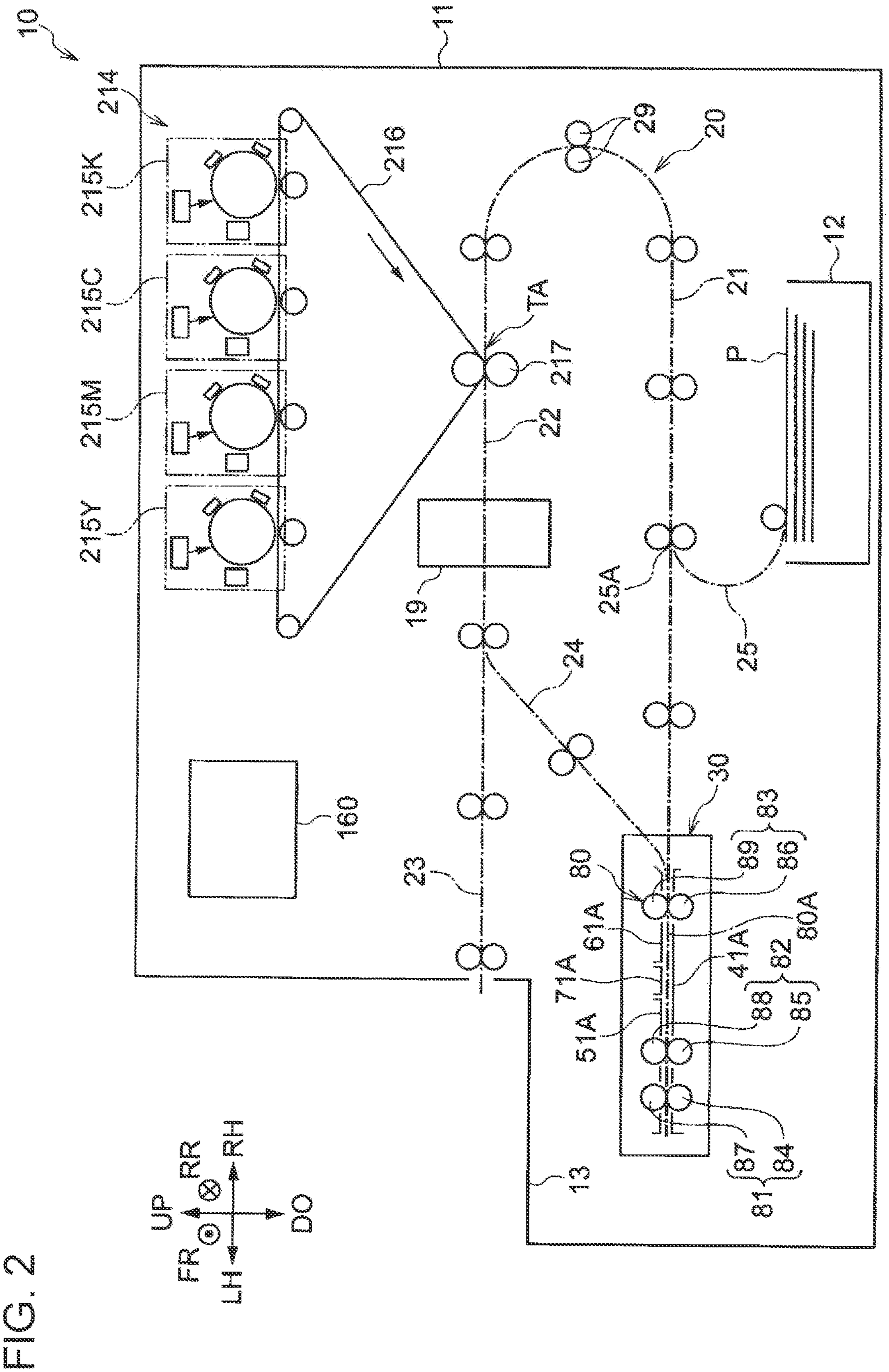
FIG. 2 is a schematic diagram illustrating the structure of the image forming apparatus according to the exemplary embodiment in which an electrophotographic image forming unit is used.

As illustrated in FIG. 2, an example of the image forming unit may be an electrophotographic image forming unit 214 that forms an image on the medium P by using toner.

As illustrated in FIG. 2, the image forming unit 214 includes toner image forming units 215Y, 215M, 215C, and 215K (hereinafter denoted by 215Y to 215K), a transfer body 216, and a transfer member 217.

In the image forming unit 214, the toner image forming units 215Y to 215K perform charging, exposure, developing, and transfer processes to form toner images of respective colors, which are yellow (Y), magenta (M), cyan (C), and black (K), on the transfer body 216. The transfer member 217 transfers the toner images of the respective colors formed on the transfer body 216 to the medium P that passes through a transfer position TA between the transfer body 216 and the transfer member 217. As a result, an image is formed on the medium P. Thus, an example of the image forming apparatus may be an electrophotographic image forming apparatus.

An example of the image forming unit may be structured such that, for example, the toner image forming units 215Y to 215K form the toner images directly on the medium P instead of the transfer body 216.

Heating Unit 19

The heating unit 19 illustrated in FIG. 1 is an example of a heating unit that heats the medium P on which an image has been formed by the image forming unit 14. For example, the heating unit 19 heats the medium P by using a heating source (not illustrated) in a contactless manner to dry the image formed of ink.

An example of the heating unit is not limited to the above-described heating unit 19. An example of the heating unit may be, for example, a device that heats the medium P by coming into contact with the medium P without affecting the image. Various types of heating units may be used.

In the electrophotographic image forming apparatus including the image forming unit 214, the heating unit 19 functions, for example, as a fixing device that fixes the toner images by applying heat.

Transport Mechanism 20

The transport mechanism 20 is a mechanism that transports the medium P. For example, the transport mechanism 20 transports the medium P by using a transport member 29 including, for example, transport rollers. The transport member 29 may be, for example, a transport belt. The transport member 29 may be any member capable of transporting the medium P by applying transporting force to the medium P.

The transport mechanism 20 transports the medium P from the medium storage unit 12 to the image forming unit 14 (more specifically, to the transfer position TA). The transport mechanism 20 further transports the medium P from the image forming unit 14 to the heating unit 19. The transport mechanism 20 further transports the medium P from the heating unit 19 to the medium output unit 13. The transport mechanism 20 also transports the medium P from the heating unit 19 to the image forming unit 14.

Thus, the image forming apparatus 10 includes a transport path 21 from the medium storage unit 12 to the image forming unit 14, a transport path 22 from the image forming unit 14 to the heating unit 19, and a transport path 23 from the heating unit 19 to the medium output unit 13. The image forming apparatus 10 also includes a transport path 24 from the heating unit 19 to the image forming unit 14.

The transport path 24 is a transport path along which the medium P having an image formed on one side thereof is returned to the image forming unit 14 (more specifically, to the transfer position TA). The transport path 24 also serves as a transport path that reverses the medium P having an image formed on one side thereof.

The transport path 21 and the transport path 24 include a common portion (more specifically, a downstream portion in the transporting direction). Accordingly, a transport path 25 along which the medium P is transported from the medium storage unit 12 may be regarded as being connected to the transport path 24 and configured to supply the medium P from the medium storage unit 12 to the transport path 24. Therefore, a position at which the transport path 25 is connected to the transport path 24 may be regarded as a supply position 25A at which a new medium P fed from the medium storage unit 12 is supplied to the transport path 24 and transported toward the image forming unit 14. In other words, according to the present exemplary embodiment, the medium P is supplied from the supply position 25A toward the image forming unit 14 through the transport path 24.

Image Forming Operation of Image Forming Apparatus 10

In the image forming apparatus 10, the medium P is transported from the medium storage unit 12 to the image forming unit 14 (more specifically, to the transfer position TA) along the transport path 21, and the image forming unit 14 forms an image, which may hereinafter be referred to as "front image", on one side (i.e., the front side) of the medium P. When an image is to be formed only on one side of the medium P, the medium P having the front image formed on one side thereof is transported through the heating unit 19 and output to the medium output unit 13.

When images are to be formed on both sides of the medium P, the medium P having the front image formed on one side thereof is transported through the heating unit 19 and then along the transport path 24, so that the medium P is reversed and returned to the image forming unit 14 (more specifically, to the transfer position TA). Then, the image forming unit 14 forms an image, which may hereinafter be referred to as "back image", on the other side (i.e., the back side) of the medium P, and then the medium P is transported through the heating unit 19 and output to the medium output unit 13. Thus, one and the other sides of the medium P serve as image forming surfaces on which images are formed.

The front image described above is an example of a first image. The back image described above is an example of a second image.

Position of Medium Storage Unit 12

As illustrated in FIG. 1, the medium storage unit 12 is disposed below the transport path 24. Therefore, each of the media P stored in the medium storage unit 12 is supplied to the supply position 25A of the transport path 24 from below.

Figure 3:
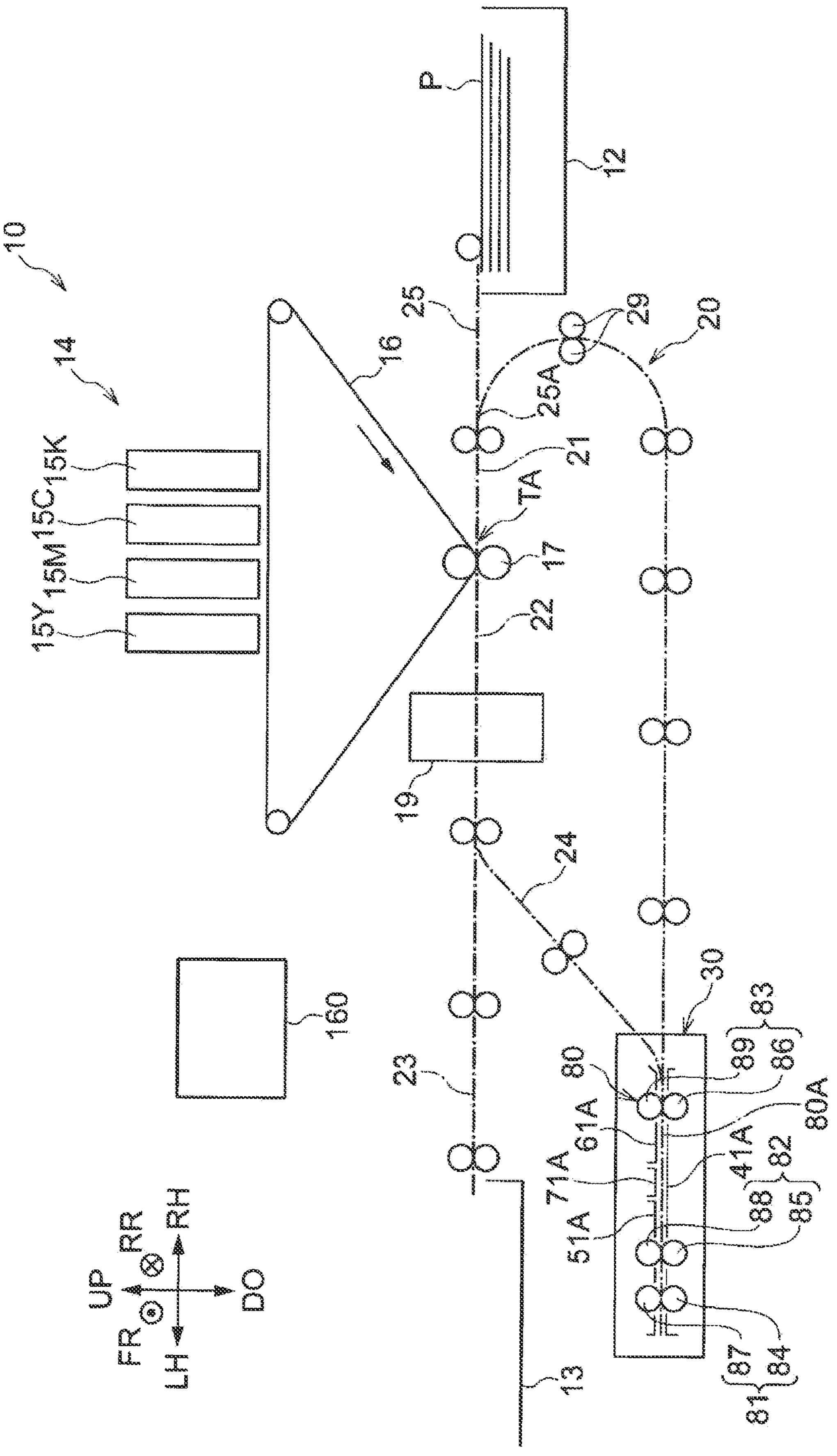
FIG. 3 is a schematic diagram illustrating the structure of the image forming apparatus according to the exemplary embodiment in which a medium storage unit is disposed on a side of a transport path.

As illustrated in FIG. 3, the medium storage unit 12 may be disposed on a side of the transport path 24. In this case, each of the media P stored in the medium storage unit 12 is supplied to the supply position 25A of the transport path 24 from the side (right side in FIG. 3). In the structure illustrated in FIG. 3, the medium storage unit 12 is disposed on a side of the image forming unit 14 (more specifically, the transfer position TA). Accordingly, each medium P is supplied to the image forming unit 14 (more specifically, to the transfer position TA) from the side. In FIG. 3, the image forming apparatus body 11 is omitted.

Detection Device 30

Figure 4:
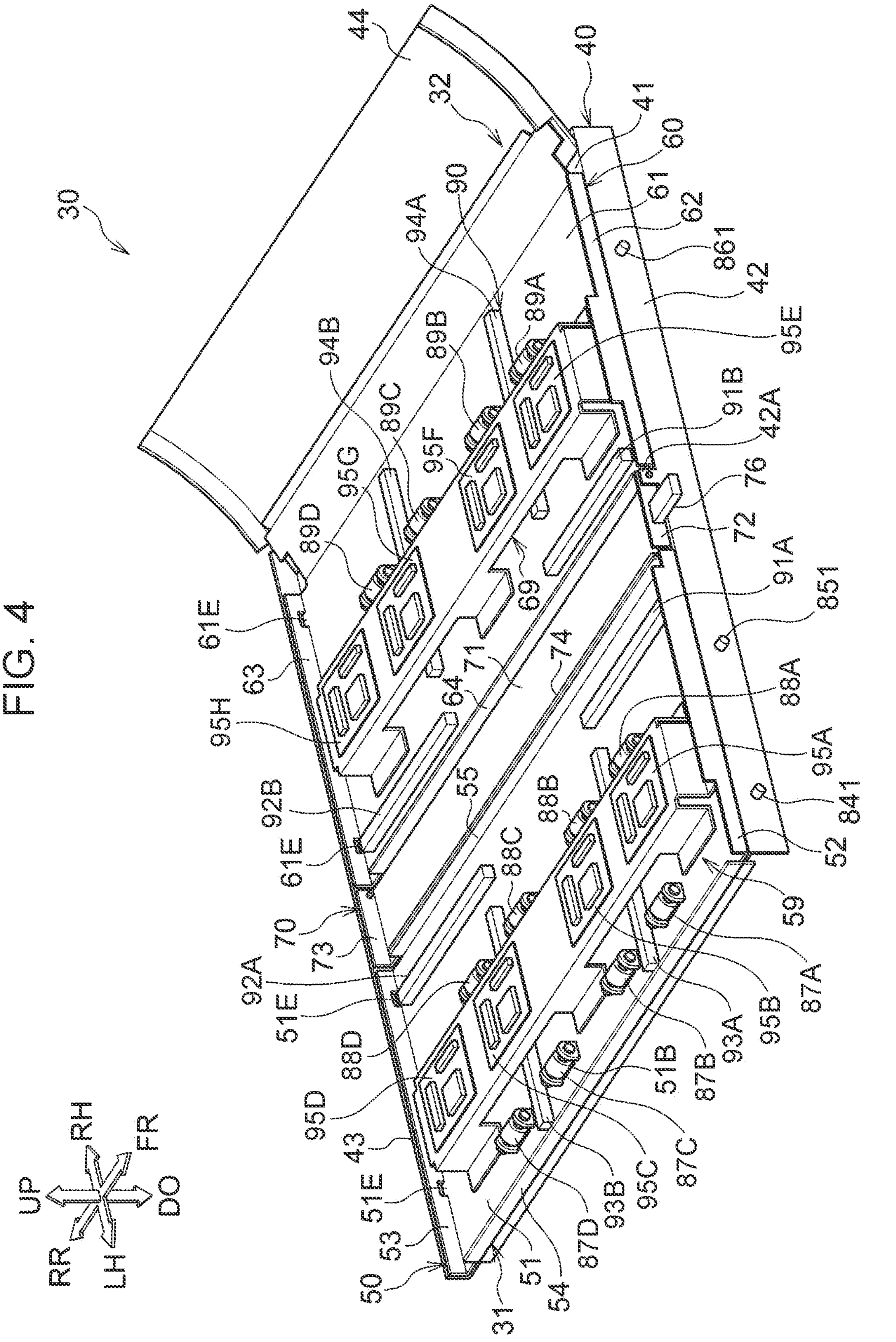
FIG. 4 is a perspective view illustrating the structure of a detection device according to the exemplary embodiment.
Figure 5:
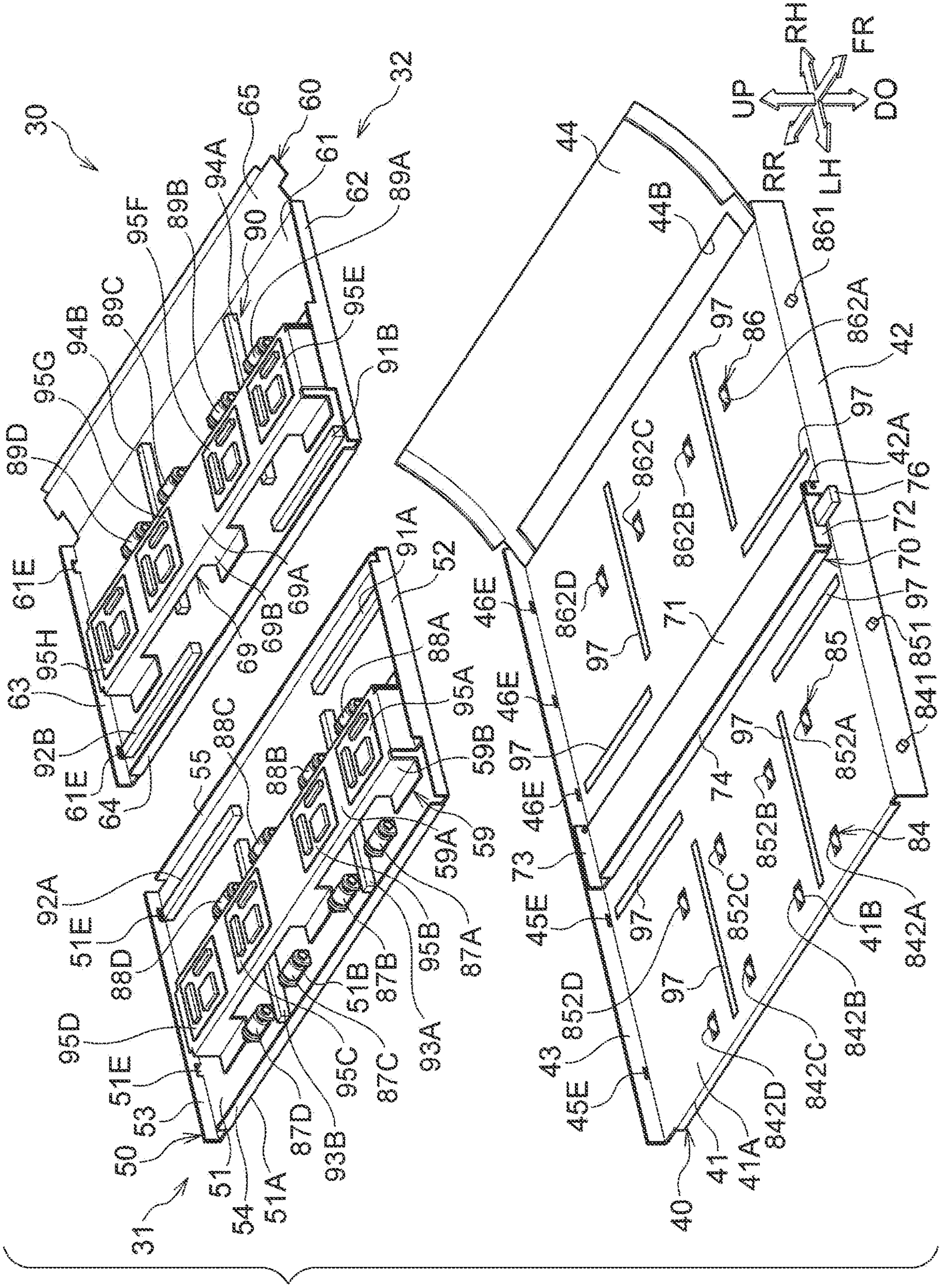
FIG. 5 is a perspective view illustrating the detection device according to the exemplary embodiment in which a first unit and a second unit are removed from a detection device body.
Figure 6:
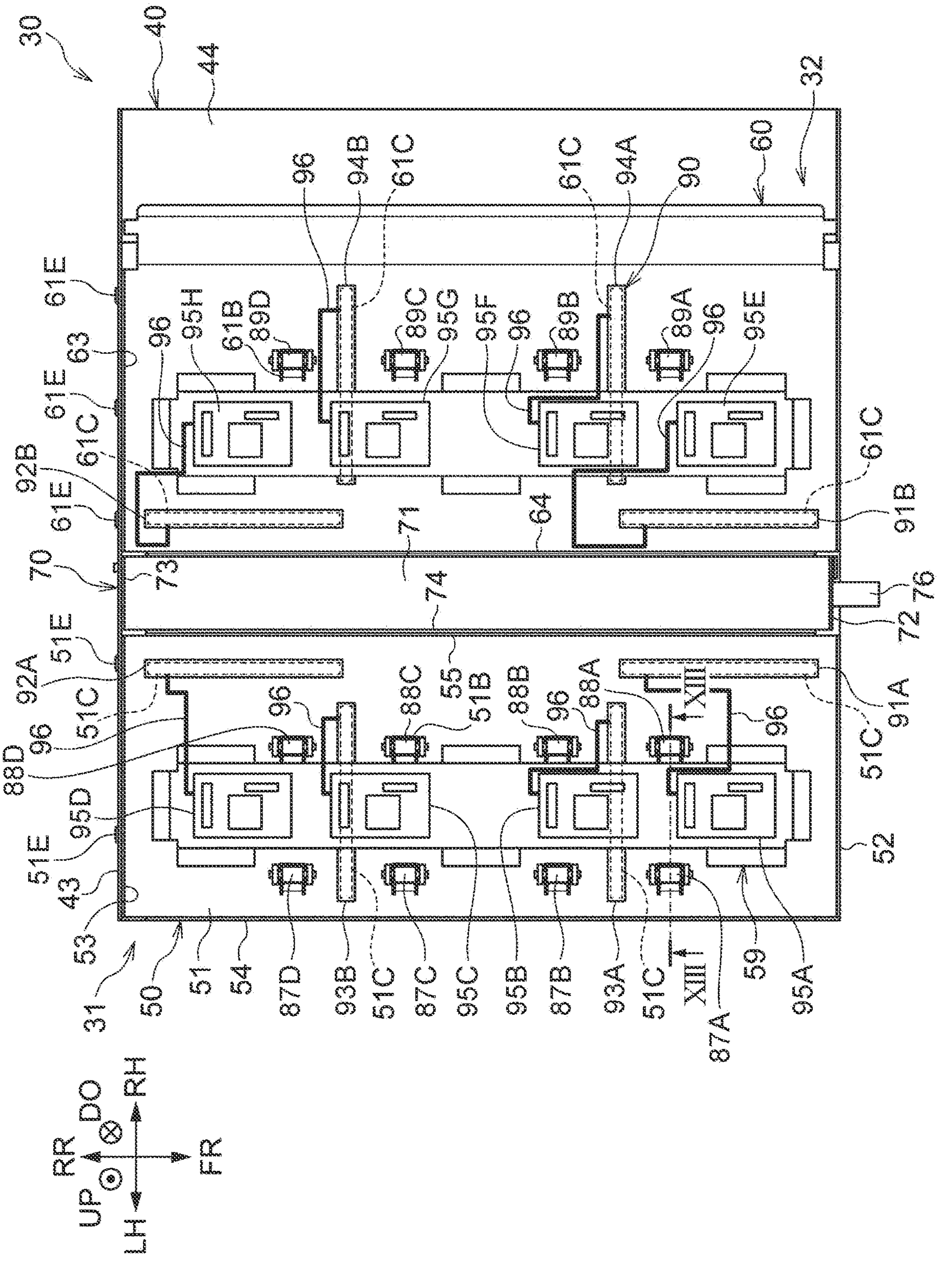
FIG. 6 is a plan view illustrating the structure of the detection device according to the exemplary embodiment.

The detection device 30 illustrated in FIG. 1 is an example of a detection device that detects edge portions of the medium P in a stopped state. FIG. 4 is a perspective view illustrating the structure of the detection device 30. FIG. 5 is a perspective view illustrating the detection device 30 in which a first unit 31 and a second unit 32 are removed from a detection device body 40. FIG. 6 is a plan view illustrating the structure of the detection device 30.

Figure 12:
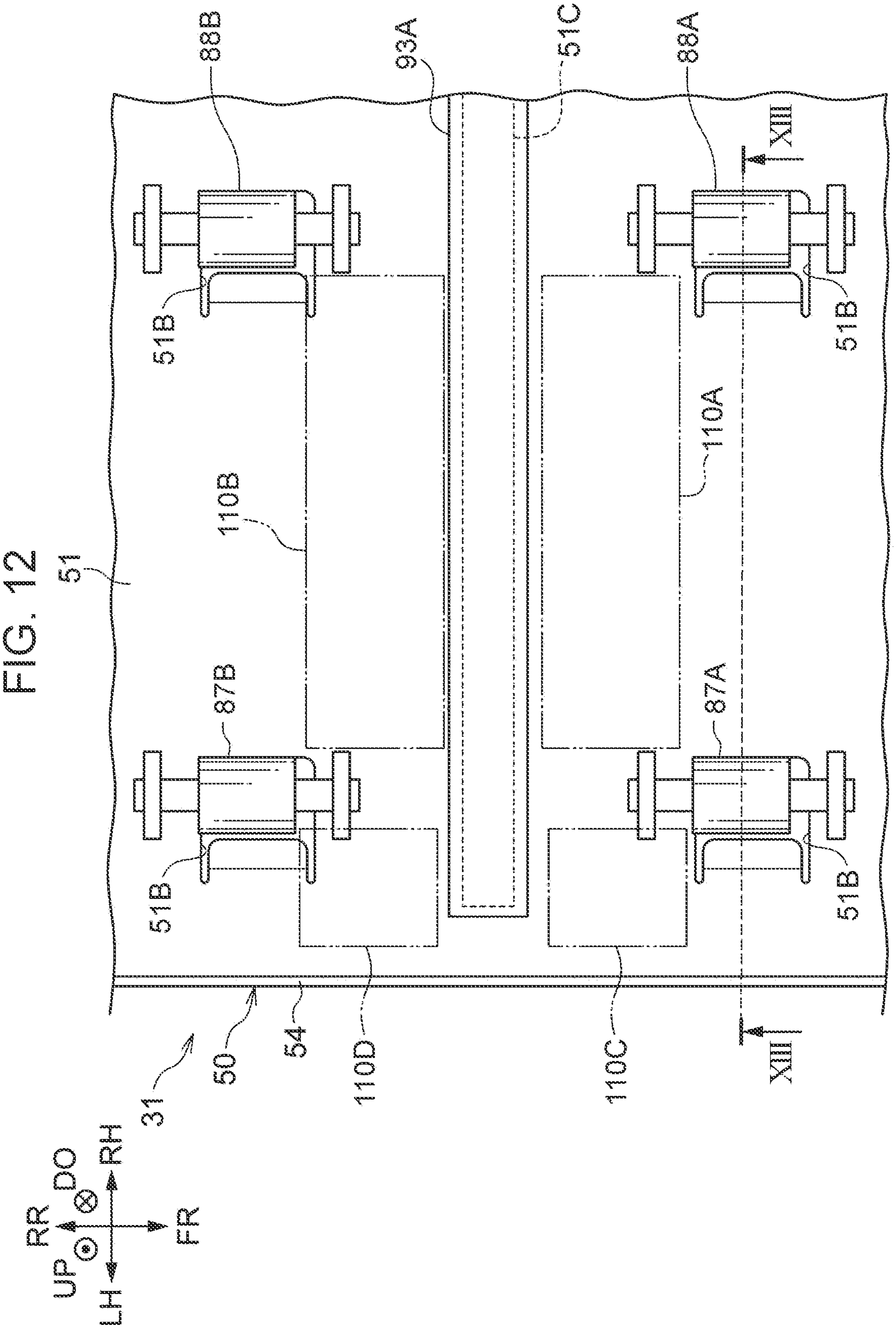
FIG. 12 is an enlarged plan view of a portion of the structure of the detection device according to the exemplary embodiment.
Figure 13:
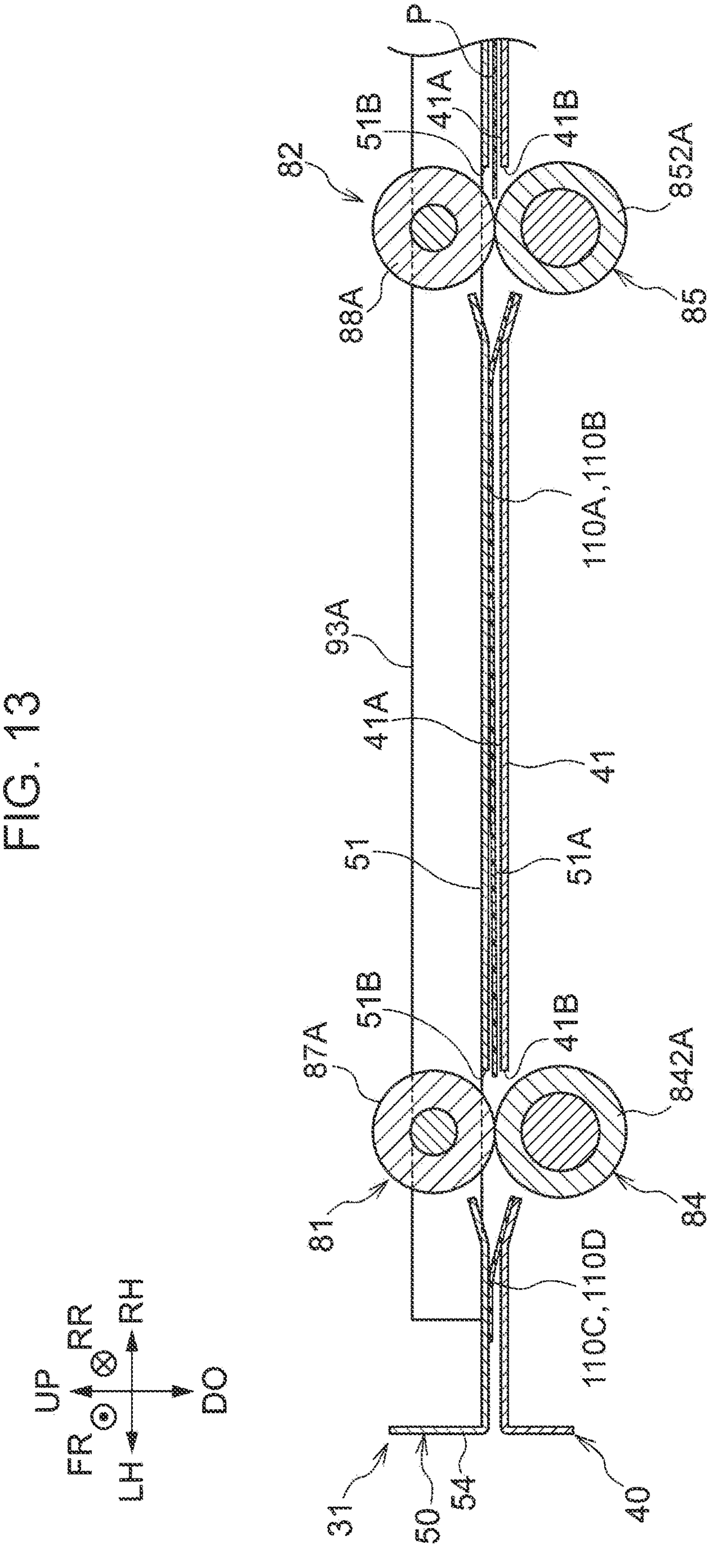
FIG. 13 is a sectional view of FIG. 6 taken along line XIII-XIII, and is also a sectional view of FIG. 12 taken along line XIII-XIII.

As illustrated in FIGS. 4 and 5, the detection device 30 includes the detection device body 40, the first unit 31, the second unit 32, an opening-closing portion 70, a transport unit 80 (see FIG. 1), a detection unit 90, and pressing members 110 (110A, 110B, 110C, and 110D) (see FIGS. 12 and 13). The shape of the detection device 30 and the structures of components of the detection device 30 will now be described. A control device 160, the position of the detection device 30 in the image forming apparatus 10, and removal of the detection device 30 from the image forming apparatus body 11 will also be described.

Shape of Detection Device 30

As illustrated in FIG. 4, the overall shape of the detection device 30 is such that the length thereof in the left-right direction, which corresponds to the transporting-direction dimension, and the length thereof in the front-rear direction, which corresponds to the width-direction dimension, are greater than the length thereof in the up-down direction. In other words, the detection device 30 has a flat shape that is thin in the up-down direction and extends in the front-rear and left-right directions (more specifically, horizontal directions). In addition, the size of the detection device 30 is at least greater than A3 because the medium P that is transported has a size of greater than A3. The shape of the detection device 30 is not limited to a flat shape, and may be various shapes.

Detection Device Body 40

As illustrated in FIG. 5, the detection device body 40 has a shape similar to the overall shape of the detection device 30, that is, a flat shape that is thin in the up-down direction and extends in the front-rear and left-right directions. More specifically, the detection device body 40 includes a plate body 41, a front plate 42, a rear plate 43, and a guide plate 44. The detection device body 40 is made of, for example, a metal material, such as a metal plate, a resin material, or other materials.

The plate body 41 has the shape of a plate that extends in the front-rear and left-right directions and that has a thickness in the up-down direction. The upper surface of the plate body 41 serves as a transport path surface 41A. The plate body 41 has plural openings 41B in which roller portions 842 (842A to 842D), 852 (852A to 852D), and 862 (862A to 862D), which will be described below, are disposed. In the present exemplary embodiment, twelve openings 41B, for example, are formed. Plural reflection plates 97, which will be described below, are arranged on the upper surface of the plate body 41. In the present exemplary embodiment, eight reflection plates 97, for example, are provided.

The front plate 42 is a plate that extends downward from the front end of the plate body 41, and is formed integrally with the plate body 41. The front plate 42 has the shape of a plate having a thickness in the front-rear direction. The front plate 42 supports driving rollers 84, 85, and 86 described below in a rotatable manner (see FIG. 11).

A support portion 42A that supports the opening-closing portion 70 is provided on the front plate 42. The support portion 42A may be formed by, for example, partially cutting the plate body 41 and raising the cut portion.

The rear plate 43 is a plate that extends upward from the rear end of the plate body 41, and is formed integrally with the plate body 41. The rear plate 43 has the shape of a plate having a thickness in the front-rear direction. As described below, the rear plate 43 functions as a positioning portion for positioning the first unit 31 and the second unit 32. The rear plate 43 has plural insertion holes 45E for receiving projections 51E described below and plural insertion holes 46E for receiving projections 61E described below. In the present exemplary embodiment, for example, two insertion holes 45E and three insertion holes 46E are formed. The insertion holes 45E and 46E are long holes that extend in the left-right direction.

The guide plate 44 is connected to the right end of the plate body 41 and extends rightward and upward from the right end of the plate body 41. The guide plate 44 has a function of guiding the medium P toward the plate body 41 (i.e., leftward). A bottom end portion of the guide plate 44 has an opening 44B through which the medium P transported rightward (i.e., in a second transporting direction described below) from the plate body 41 passes. The guide plate 44 has a relatively small curvature. More specifically, the curvature of the guide plate 44 is, for example, less than the curvature of the transport path 25. Therefore, the medium P transported along the guide plate 44 is not easily bent. As a result, scratch marks are not easily formed on the medium P and the image formed on the medium P when the medium P slides along the guide plate 44.

First Unit 31

As illustrated in FIGS. 4 and 5, the first unit 31 is disposed above the detection device body 40. More specifically, the first unit 31 is disposed above a left portion of the detection device body 40. Still more specifically, the first unit 31 constitutes an upper left portion of the detection device 30.

The first unit 31 includes a unit body 50 and a substrate support 59. The first unit 31 also includes driven rollers 87 (87A to 87D) and 88 (88A to 88D) (described below) of the transport unit 80; sensors 91A, 92A, 93A, and 93B (described below) of the detection unit 90; and sensor substrates 95A, 95B, 95C, and 95D. The first unit 31 is made of, for example, a metal material, such as a metal plate, a resin material, or other materials.

As illustrated in FIG. 5, the unit body 50 includes a plate body 51, a front plate 52, a rear plate 53, a left plate 54, and a right plate 55. The plate body 51 has the shape of a plate that extends in the front-rear and left-right directions and that has a thickness in the up-down direction. The lower surface of the plate body 51 serves as a transport path surface 51A (see FIGS. 5, 7A, 7B, and 13). The plate body 51 has openings 51B in which the driven rollers 87 and 88 are disposed and openings 51C (see FIG. 6) in which the sensors 91A, 92A, 93A, and 93B are disposed. The plate body 51 is disposed above the plate body 41 of the detection device body 40 and faces the plate body 41 with a gap therebetween (see FIGS. 7A, 7B, and 13).

The front plate 52 is a plate that extends upward from the front end of the plate body 51. The rear plate 53 is a plate that extends upward from the rear end of the plate body 51. The front plate 52 and the rear plate 53 each have the shape of a plate having a thickness in the front-rear direction.

The left plate 54 is a plate that extends upward from the left end of the plate body 51. The right plate 55 is a plate that extends upward from the right end of the plate body 51. The left plate 54 and the right plate 55 each have the shape of a plate having a thickness in the left-right direction.

Figure 7A:
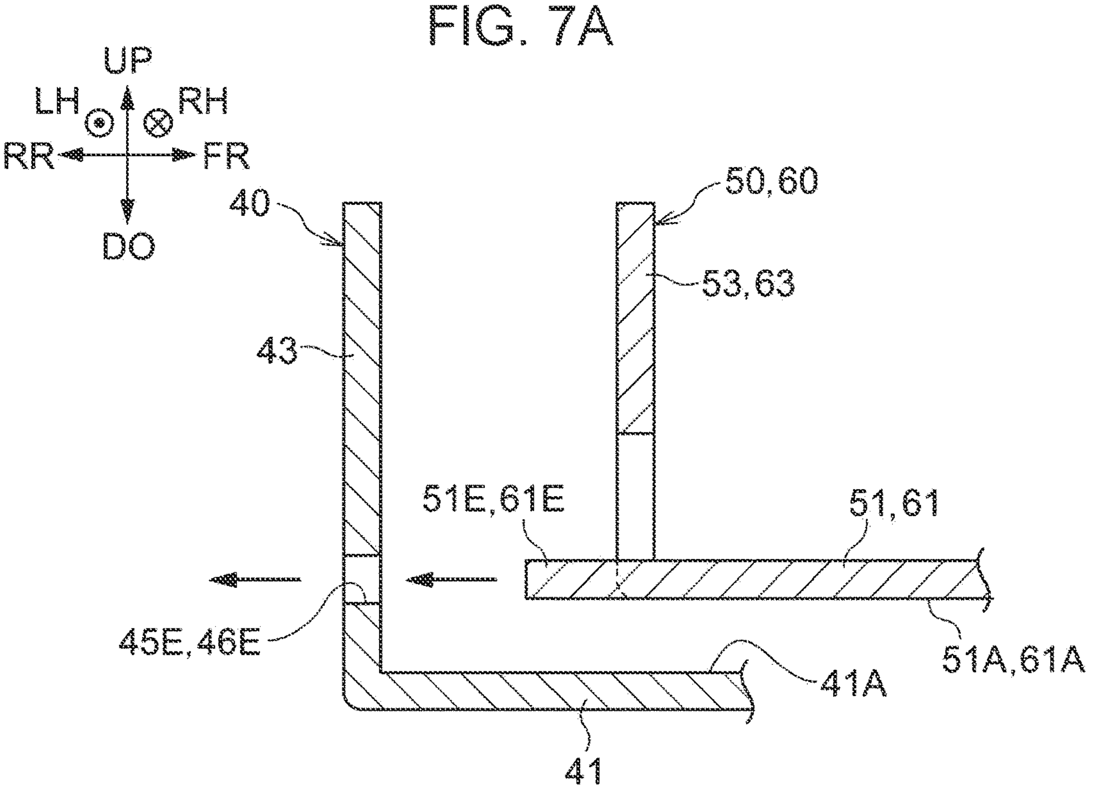
FIGS. 7A and 7B are sectional views used to describe positioning in a rear region of the detection device according to the exemplary embodiment.
Figure 7B:
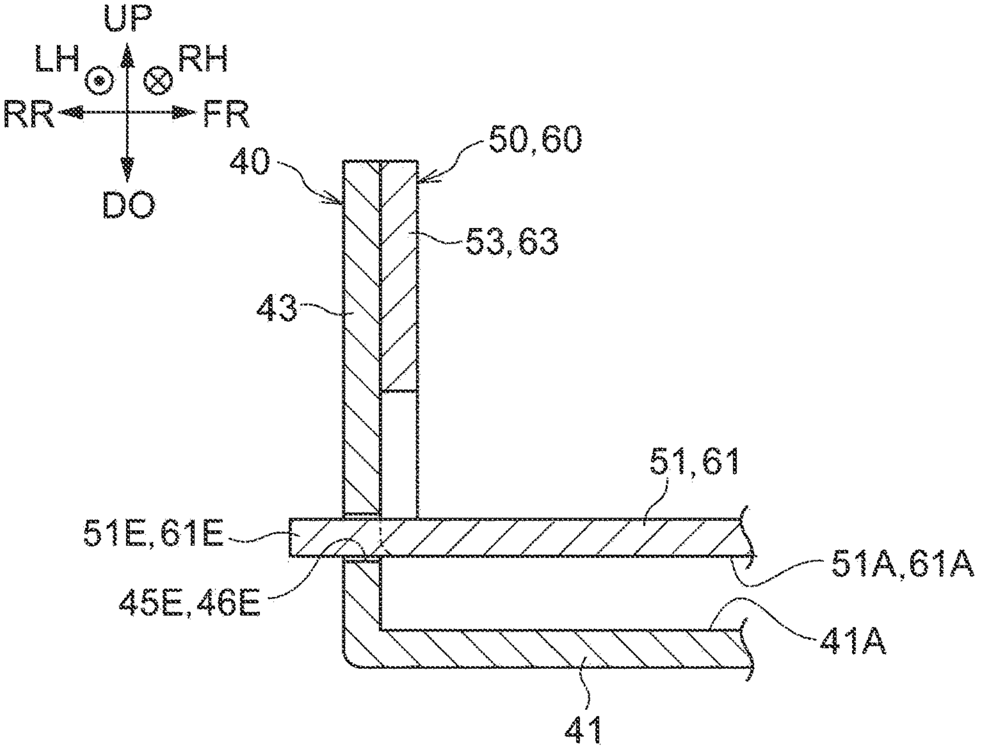

As illustrated in FIGS. 5, 6, 7A, and 7B, the projections 51E to be inserted through the insertion holes 45E in the rear plate 43 of the detection device body 40 are provided at the rear end of the plate body 51. The projections 51E are on the same plane as the plate body 51, and project rearward from the rear plate 53. The projections 51E are formed by, for example, partially cutting the rear plate 53 and raising the cut portions. As illustrated in FIGS. 7A and 7B, in a rear region of the first unit 31, the projections 51E are inserted through the insertion holes 45E, and the rear plate 53 abuts on the rear plate 43 of the detection device body 40.

Figure 8:
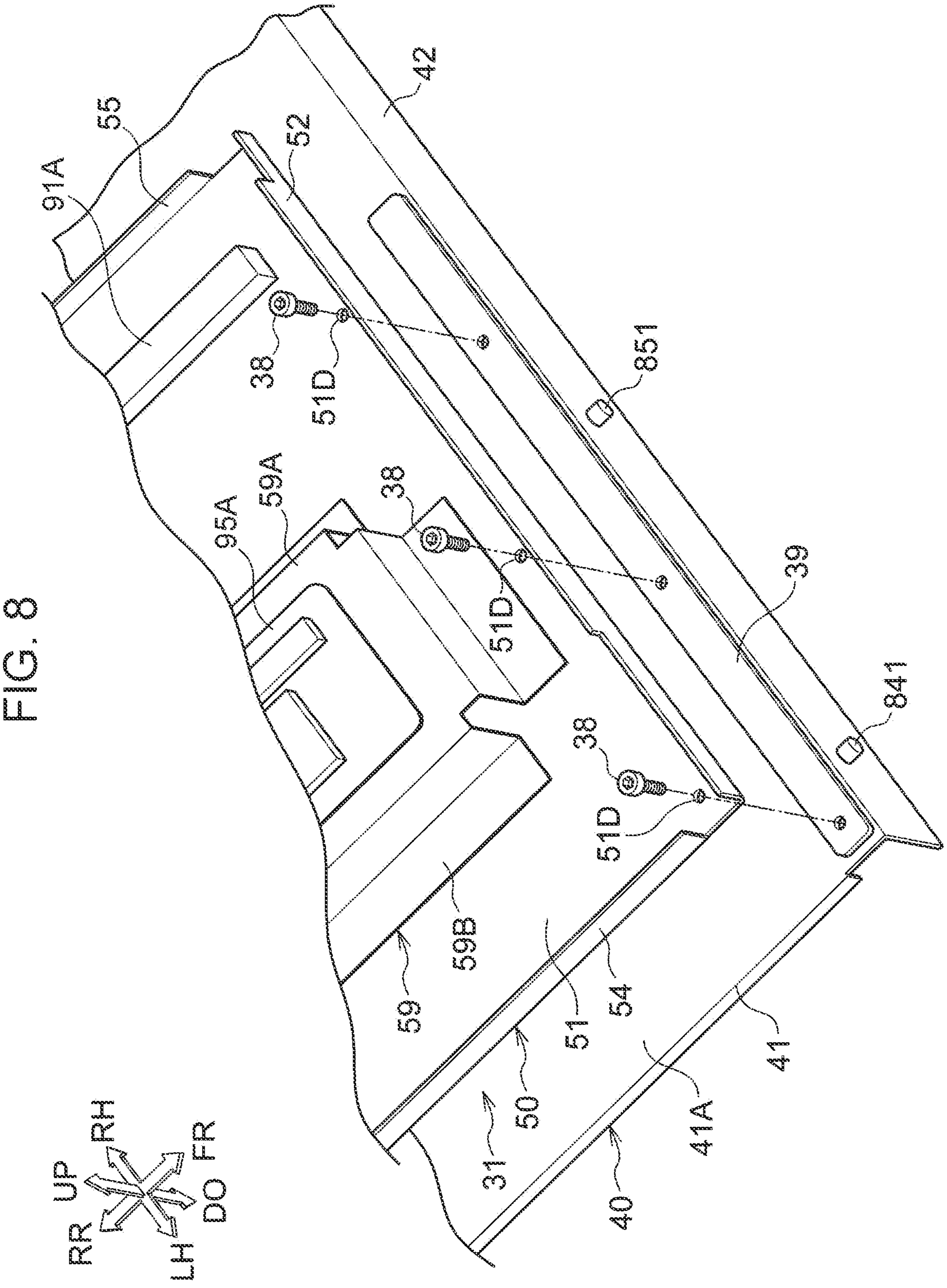
FIG. 8 is a perspective view used to describe positioning in a front region of the detection device according to the exemplary embodiment.
Figure 9A:
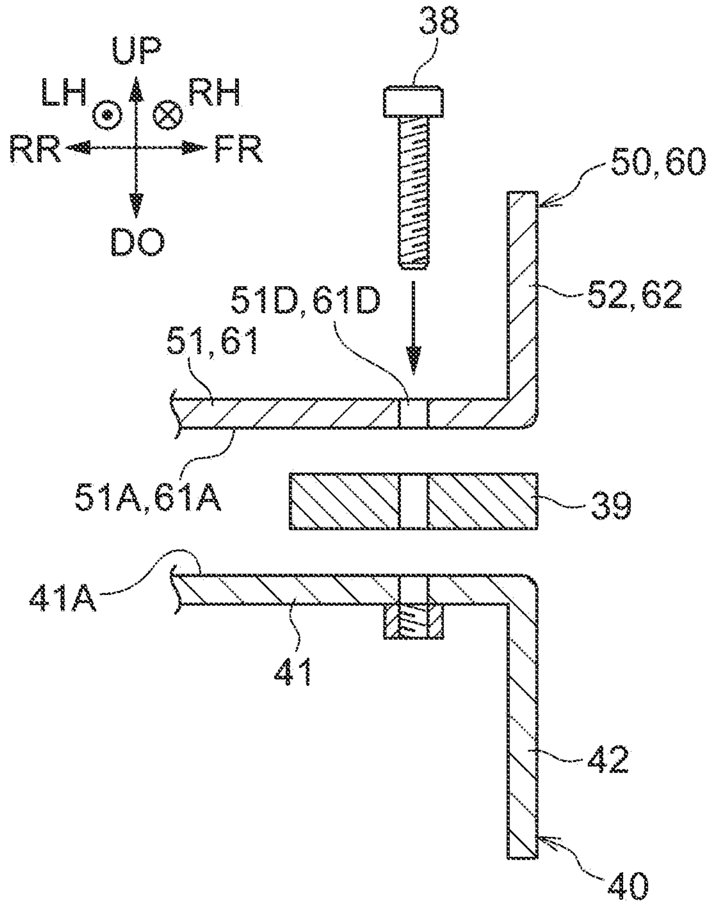
FIGS. 9A and 9B are sectional views used to describe positioning in the front region of the detection device according to the exemplary embodiment.
Figure 9B:
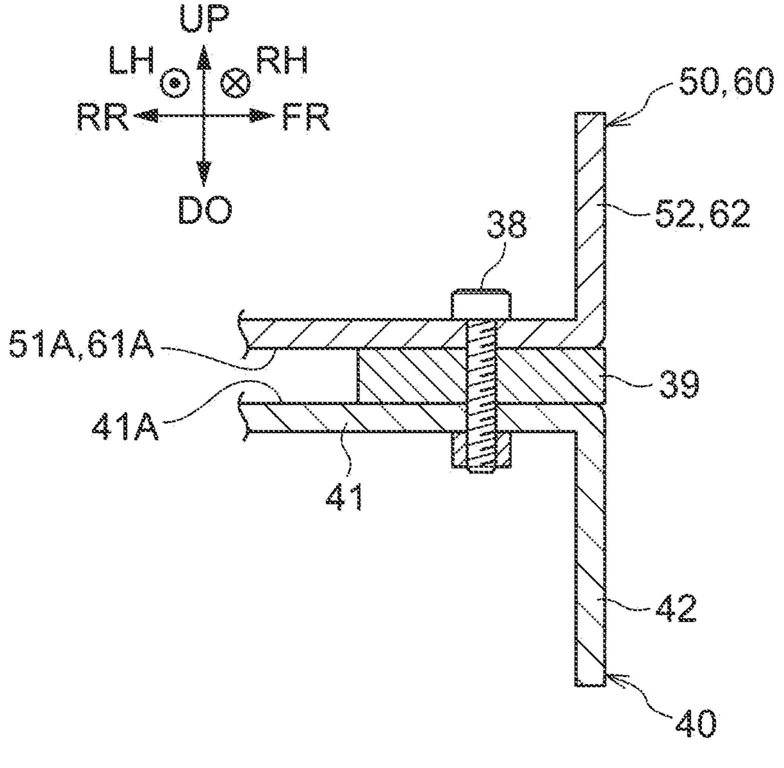

Referring to FIGS. 8, 9A, and 9B, a front portion of the plate body 51 has plural through holes 51D for receiving fastening members 38, such as bolts. The through holes 51D are arranged in the left-right direction. In a front region of the first unit 31, the plate body 51 of the first unit 31 and the plate body 41 of the detection device body 40 are fastened together with the fastening members 38 such that a spacer 39 is disposed between the plate body 51 and the plate body 41.

The rear plate 53 abuts on the rear plate 43 of the detection device body 40 so that the first unit 31 is positioned with respect to the detection device body 40 in the front-rear direction. In addition, the projections 51E are inserted through the insertion holes 45E, and the plate body 51 and the plate body 41 are fastened together with the fastening members 38 with the spacer 39 disposed therebetween, so that the first unit 31 is positioned with respect to the detection device body 40 in the up-down and left-right directions.

The first unit 31 may be removed from the detection device body 40 by removing the fastening members 38. In other words, the first unit 31 is removably attached to the detection device body 40. In the present exemplary embodiment, as described above, the first unit 31 is attached to the detection device body 40 with the fastening members 38. However, an attachment member used to attach the first unit 31 to the detection device body 40 is not limited to the fastening members 38. The attachment member may be, for example, a clamp. The attachment member may be any member capable of attaching the first unit 31 to the detection device body 40.

As illustrated in FIGS. 4 and 5, the substrate support 59 has a function of supporting the sensor substrates 95 (95A to 95D) described below. More specifically, as illustrated in FIG. 5, the substrate support 59 includes an attachment plate 59A and connection plates 59B. The attachment plate 59A is disposed above the plate body 51. The sensor substrates 95 are attached to the attachment plate 59A. The connection plates 59B extend downward from the attachment plate 59A and are connected to the plate body 51.

Second Unit 32

As illustrated in FIGS. 4 and 5, the second unit 32 is disposed above the detection device body 40. More specifically, the second unit 32 is disposed above a right portion of the detection device body 40. Still more specifically, the second unit 32 constitutes an upper right portion of the detection device 30. Thus, an upper portion of the detection device 30 is dividable into the first unit 31 and the second unit 32.

The second unit 32 includes a unit body 60 and a substrate support 69. The second unit 32 also includes driven rollers 89 (89A to 89D) (described below) of the transport unit 80; sensors 91B, 92B, 94A, and 94B (described below) of the detection unit 90; and sensor substrates 95E, 95F, 95G, and 95H. The second unit 32 is made of, for example, a metal material, such as a metal plate, a resin material, or other materials.

As illustrated in FIG. 5, the unit body 60 includes a plate body 61, a front plate 62, a rear plate 63, a left plate 64, and a right plate 65. The plate body 61 has the shape of a plate that extends in the front-rear and left-right directions and that has a thickness in the up-down direction. The lower surface of the plate body 61 serves as a transport path surface 61A (see FIGS. 5, 7A, and 7B). The plate body 61 has openings 61B in which the driven rollers 89 are disposed and openings 61C (see FIG. 6) in which the sensors 91B, 92B, 94A, and 94B are disposed. The plate body 61 is disposed above the plate body 41 of the detection device body 40 and faces the plate body 41 with a gap therebetween (see FIGS. 7A and 7B).

The front plate 62 is a plate that extends upward from the front end of the plate body 61. The rear plate 63 is a plate that extends upward from the rear end of the plate body 61. The front plate 62 and the rear plate 63 each have the shape of a plate having a thickness in the front-rear direction.

The left plate 64 is a plate that extends upward from the left end of the plate body 61. The right plate 65 is a plate that extends upward along the guide plate 44 from the right end of the plate body 61. The left plate 64 has the shape of a plate having a thickness in the left-right direction.

As illustrated in FIGS. 5, 6, 7A, and 7B, the projections 61E to be inserted through the insertion holes 46E in the rear plate 43 of the detection device body 40 are provided at the rear end of the plate body 61. The projections 61E are on the same plane as the plate body 61, and project rearward from the rear plate 63. The projections 61E are formed by, for example, partially cutting the rear plate 63 and raising the cut portions. As illustrated in FIGS. 7A and 7B, in a rear region of the second unit 32, the projections 61E are inserted through the insertion holes 46E, and the rear plate 63 abuts on the rear plate 43 of the detection device body 40.

Referring to FIGS. 9A and 9B, a front portion of the plate body 61 has plural through holes 61D for receiving fastening members 38, such as bolts. The through holes 61D are arranged in the left-right direction. In a front region of the second unit 32, the plate body 61 of the second unit 32 and the plate body 41 of the detection device body 40 are fastened together with the fastening members 38 such that a spacer 39 is disposed between the plate body 61 and the plate body 41.

The rear plate 63 abuts on the rear plate 43 of the detection device body 40 so that the second unit 32 is positioned with respect to the detection device body 40 in the front-rear direction. In addition, the projections 61E are inserted through the insertion holes 46E, and the plate body 61 and the plate body 41 are fastened together with the fastening members 38 with the spacer 39 disposed therebetween, so that the second unit 32 is positioned with respect to the detection device body 40 in the up-down and left-right directions.

The second unit 32 may be removed from the detection device body 40 by removing the fastening members 38. In other words, the second unit 32 is removably attached to the detection device body 40.

As illustrated in FIGS. 4 and 5, the substrate support 69 has a function of supporting the sensor substrates 95 (95E to 95H) described below. More specifically, as illustrated in FIG. 5, the substrate support 69 includes an attachment plate 69A and connection plates 69B. The attachment plate 69A is disposed above the plate body 61. The sensor substrates 95 are attached to the attachment plate 69A. The connection plates 69B extend downward from the attachment plate 69A and are connected to the plate body 61.

Opening-Closing Portion 70

Figure 10:
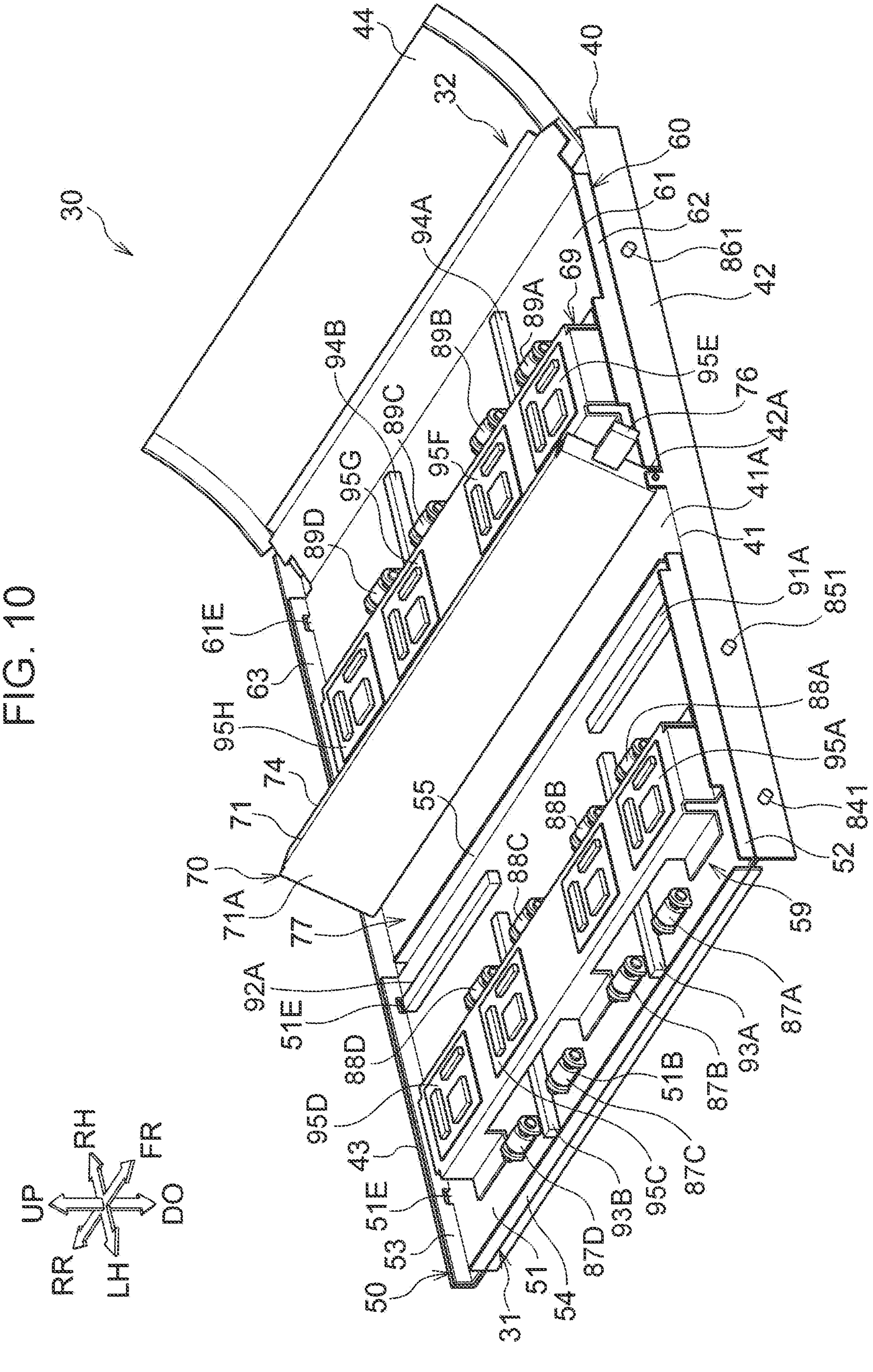
FIG. 10 is a perspective view illustrating the structure illustrated in FIG. 4 in which an opening-closing portion has been moved to an open position.

As illustrated in FIGS. 4 and 10, the opening-closing portion 70 has a function of covering and uncovering an opening 77 at which a transport path 80A (see FIG. 1) of the transport unit 80 is exposed. As illustrated in FIG. 4, the opening-closing portion 70 is disposed above the detection device body 40 and between the first unit 31 and the second unit 32. The opening-closing portion 70 is disposed between the sensors 91A and 92A provided in the first unit 31 and the sensors 91B and 92B provided in the second unit 32 in a region where the sensors 91 (91A and 91B), 92 (92A and 92B), 93 (93A and 93B), and 94 (94A and 94B) are not disposed. The opening-closing portion 70 is made of, for example, a metal material, such as a metal plate, a resin material, or other materials.

As illustrated in FIGS. 4 and 5, the opening-closing portion 70 includes a plate body 71, a front plate 72, a rear plate 73, a left plate 74, and a knob 76. The plate body 71 has the shape of a plate that extends in the front-rear and left-right directions and that has a thickness in the up-down direction. The lower surface of the plate body 71 serves as a transport path surface 71A (see FIG. 10).

The front plate 72 is a plate that extends upward from the front end of the plate body 71. The rear plate 73 is a plate that extends upward from the rear end of the plate body 71. The front plate 72 and the rear plate 73 each have the shape of a plate having a thickness in the front-rear direction. The left plate 74 is a plate that extends upward from the left end of the plate body 71. The left plate 74 has the shape of a plate having a thickness in the left-right direction.

As illustrated in FIGS. 4 and 10, the opening-closing portion 70 is supported by the detection device body 40 such that the opening-closing portion 70 is capable of covering and uncovering the opening 77 at which the transport path 80A (see FIG. 1) of the transport unit 80 is exposed. More specifically, the opening-closing portion 70 is movable between a closed position (position illustrated in FIG. 4) at which the opening 77 is covered and an open position (position illustrated in FIG. 10) at which the opening 77 is uncovered. More specifically, the front plate 72 and the rear plate 73 of the opening-closing portion 70 are rotatably supported by the support portion 42A and the rear plate 43, respectively, of the detection device body 40 at right ends thereof.

When the opening-closing portion 70 is at the closed position, the opening-closing portion 70 is disposed above the plate body 41 of the detection device body 40 and faces the plate body 41 with a gap therebetween. The knob 76 is provided on a front surface of the front plate 72 and projects forward from the front plate 72. An operator holds the knob 76 and moves the opening-closing portion 70 between the closed position and the open position.

The opening-closing portion 70 is opened and closed, for example, to remove the medium P when the medium P is jammed in the transport path 80A (see FIG. 1). The purpose of opening and closing the opening-closing portion 70 is not limited to this, and the opening-closing portion 70 may be opened and closed for various other purposes, for example, to clean the transport path surface 71A and the transport path surface 41A of the transport path 80A (see FIG. 1). It may be necessary to prevent the medium P from being noticeably damaged. Whether or not the medium P and the image will be noticeably damaged depends on the curvature of the guide plate 44 and the stiffness of the medium P, and there is also a possibility that the medium P will be noticeably damaged by foreign matter that has entered the transport path 80A. Therefore, the transport path 80A may be exposed and cleaned.

Summary of Transport Unit 80

The transport unit 80 illustrated in FIG. 1 stops transportation of the medium P on which the front image is formed and, after the medium P has been in a stopped state, restarts the transportation of the medium P toward the image forming unit 14 (more specifically, toward the transfer position TA). More specifically, the transport unit 80 transports the medium P in a leftward direction (transporting direction before stoppage of the medium P is hereinafter referred to as a "first transporting direction"), stops transporting the medium P in the leftward direction, and restarts the transportation of the medium P in a rightward direction (transporting direction after stoppage of the medium P is hereinafter referred to as a "second transporting direction") after the medium P has been in the stopped state. Thus, the transport unit 80 restarts the transportation of the medium P in the second transporting direction that differs from the first transporting direction after the medium P has been in the stopped state. More specifically, the first and second transporting directions are opposite to each other. In other words, the transport unit 80 transports the medium P in a switch-back manner. In the present exemplary embodiment, the leftward direction corresponds to the first transporting direction, and the rightward direction corresponds to the second transporting direction. The transport unit 80 transports a single medium P. In addition, the transport unit 80 stops the medium P at a predetermined stop position.

As described above, the transport unit 80 of the detection device 30 is a unit that stops the transportation of the medium P in a predetermined transporting direction, and an example of the "predetermined transporting direction" is the first transporting direction. In other words, the first transporting direction is an example of the transporting direction of the medium P before stoppage. The first transporting direction is also an example of a "first direction". In the present exemplary embodiment, the medium P may be regarded as being transported in a direction from an end of the detection device 30 close to the transport path of the image forming apparatus body 11 and the guide plate 44 toward an end of the detection device 30 away from the transport path of the image forming apparatus body 11 and the guide plate 44 before being stopped. Therefore, an example of the first direction may also be a direction defined as the direction from the end of the detection device 30 close to the transport path of the image forming apparatus body 11 and the guide plate 44 toward the end of the detection device 30 away from the transport path of the image forming apparatus body 11 and the guide plate 44. The above-described "transport path of the image forming apparatus body 11" is a portion of transport path 24 disposed outside the detection device 30 in the image forming apparatus body 11.

The transport unit 80 of the detection device 30 is also a unit that restarts the transportation of the medium P in a predetermined transporting direction after the medium P has been in the stopped state, and an example of the "predetermined transporting direction" is the second transporting direction. In other words, the second transporting direction is an example of the transporting direction of the medium P after stoppage. The second transporting direction is also an example of a "second direction". In the present exemplary embodiment, the medium P may be regarded as being transported in a direction from the end of the detection device 30 away from the transport path of the image forming apparatus body 11 and the guide plate 44 toward the end of the detection device 30 close to the transport path of the image forming apparatus body 11 and the guide plate 44 after being stopped. Therefore, an example of the second direction may also be a direction defined as the direction from the end of the detection device 30 away from the transport path of the image forming apparatus body 11 and the guide plate 44 toward the end of the detection device 30 close to the transport path of the image forming apparatus body 11 and the guide plate 44.

As described above, the first and second transporting directions are opposite to each other. Therefore, the upstream side in the first transporting direction may be regarded as the downstream side in the second transporting direction, and the downstream side in the first transporting direction may be regarded as the upstream side in the second transporting direction. Accordingly, in the detection device 30, components disposed at the upstream side in the first transporting direction may be regarded as components disposed at the downstream side in the second transporting direction, and components disposed at the downstream side in the first transporting direction may be regarded as components disposed at the upstream side in the second transporting direction.

In the description of the detection device 30, the "transporting direction" means the "first transporting direction". Therefore, in the description of the detection device 30, the "first transporting direction" may be referred to simply as the "transporting direction".

Structure of Transport Unit 80

As illustrated in FIG. 1, the transport unit 80 includes transport members 81, 82, and 83 that transport the medium P. The transport member 83 is disposed in an upstream region of the detection device 30 in the transporting direction (more specifically, in the right region).

The transport member 82 is disposed downstream of the transport member 83 in the transporting direction (more specifically, on the left side of the transport member 83). The transport member 81 is disposed downstream of the transport member 82 in the transporting direction (more specifically, on the left side of the transport member 82).

The transport members 81, 82, and 83 respectively include driving rollers 84, 85, and 86 that are rotated to apply transporting force to the medium P, and driven rollers 87, 88, and 89 that are driven by the driving rollers 84, 85, and 86. The driving rollers 84, 85, and 86 are examples of a rotating member, and the driven rollers 87, 88, and 89 are examples of a driven member.

Figure 11:
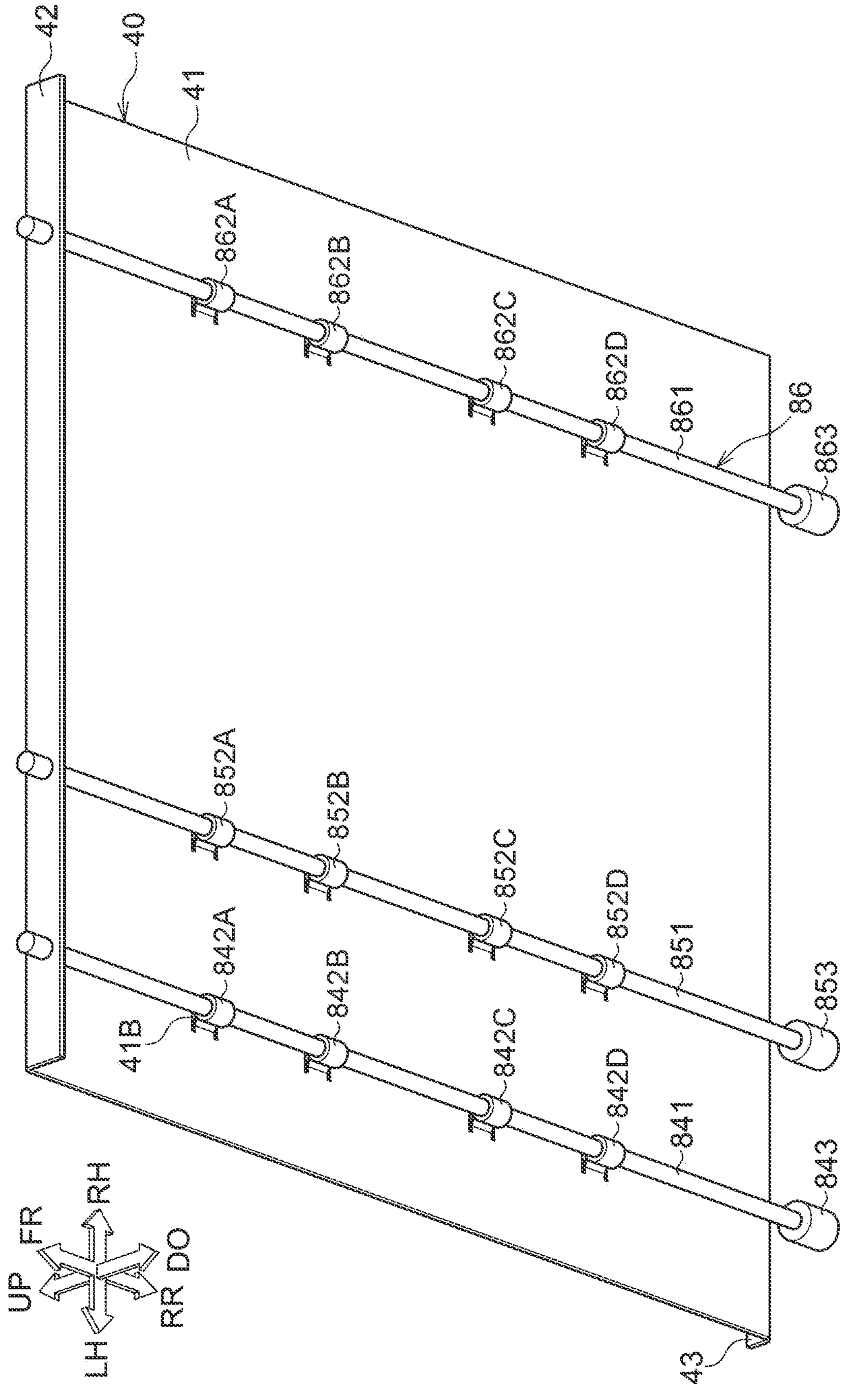
FIG. 11 is a perspective view of the detection device body of the detection device according to the exemplary embodiment viewed from below.

As illustrated in FIG. 11, the driving rollers 84, 85, and 86 respectively include shaft portions 841, 851, and 861; the roller portions 842, 852, and 862; and connecting portions 843, 853, and 863. The shaft portions 841, 851, and 861 extend in the front-rear direction. One end (more specifically, front end) of each of the shaft portions 841, 851, and 861 in the axial direction is rotatably supported by the front plate 42 of the detection device body 40. The other end (more specifically, rear end) of each of the shaft portions 841, 851, and 861 in the axial direction is rotatably supported by a shaft support (not illustrated) provided on the plate body 41 of the detection device body 40.

The numbers of the roller portions 842, 852, and 862 are more than one, and the roller portions 842, 852, and 862 are arranged with intervals therebetween in the axial directions of the shaft portions 841, 851, and 861. The roller portions 842, 852, and 862 project upward through respective ones of the openings 41B in the plate body 41. More specifically, the roller portions 842, 852, and 862 of the driving rollers 84, 85, and 86 (more specifically, contact portions that come into contact with the medium P) project upward from the transport path surface 41A of the detection device body 40. In the present exemplary embodiment, the numbers of the roller portions 842, 852, and 862 are four, as indicated by the letters A, B, C, and D added to the reference numerals thereof in the drawings.

The connecting portions 843, 853, and 863 are connected to rotating portions (not illustrated) rotated by driving force supplied from driving units (not illustrated), such as motors. The connecting portions 843, 853, and 863 are composed of shaft couplings (also referred to as couplings) connected to the rotating portions in an axial direction. In the present exemplary embodiment, the rotating portions, the driving units, and a controller (not illustrated) that controls the operation of the driving units are disposed in, for example, the image forming apparatus body 11. In other words, in the present exemplary embodiment, the rotating portions, the driving units, and the controller are not components of the detection device 30. The connecting portions 843, 853, and 863 of the driving rollers 84, 85, and 86 are connected to the rotating portions (not illustrated) disposed in the image forming apparatus body 11, and the driving force supplied from the driving units (not illustrated) disposed in the image forming apparatus body 11 is transmitted to the roller portions 842, 852, and 862 through the shaft portions 841, 851, and 861, so that the roller portions 842, 852, and 862 are rotated. The controller may be composed of the control device 160, or be provided as a control device different from the control device 160.

As illustrated in FIGS. 4 and 5, the numbers of the driven rollers 87, 88, and 89 are more than one. More specifically, the numbers of the driven rollers 87, 88, and 89 are the same as the numbers of the roller portions 842, 852, and 862, respectively. In the present exemplary embodiment, the numbers of the driven rollers 87, 88, and 89 are four, as indicated by the letters A, B, C, and D added to the reference numerals thereof in the drawings.

The driven rollers 87, 88, and 89 are disposed to face respective ones of the roller portions 842, 852, and 862. More specifically, the numbers of the driven rollers 87, 88, and 89 are more than one (four in the present exemplary embodiment), and the driven rollers 87, 88, and 89 are arranged in the front-rear direction. The letters A, B, C, and D are added to the reference numerals of the driven rollers 87, 88, and 89 such that the rollers denoted by the reference numerals with the letters A, B, C, and D added thereto are arranged in that order in the front-to-rear direction.

When viewed in a direction perpendicular to the image forming surface of the medium P, the driven rollers 87A and 87B are arranged with the sensor 93A described below disposed therebetween in the front-rear direction, and the driven rollers 88A and 88B are also arranged with the sensor 93A described below disposed therebetween in the front-rear direction.

When viewed in the direction perpendicular to the image forming surface of the medium P, the roller portions 842A and 842B are also arranged with the sensor 93A described below disposed therebetween in the front-rear direction, and the roller portions 852A and 852B are also arranged with the sensor 93A described below disposed therebetween in the front-rear direction.

More specifically, a left portion of the sensor 93A described below is disposed between the driven rollers 87A and 87B and between the roller portions 842A and 842B in the front-rear direction. A right portion of the sensor 93A described below is disposed between the driven rollers 88A and 88B and between the roller portions 852A and 852B in the front-rear direction.

When viewed in the direction perpendicular to the image forming surface of the medium P, the driven rollers 87C and 87D are arranged with the sensor 93B described below disposed therebetween in the front-rear direction, and the driven rollers 88C and 88D are also arranged with the sensor 93B described below disposed therebetween in the front-rear direction.

When viewed in the direction perpendicular to the image forming surface of the medium P, the roller portions 842C and 842D are also arranged with the sensor 93B described below disposed therebetween in the front-rear direction, and the roller portions 852C and 852D are also arranged with the sensor 93B described below disposed therebetween in the front-rear direction.

More specifically, a left portion of the sensor 93B described below is disposed between the driven rollers 87C and 87D and between the roller portions 842C and 842D in the front-rear direction. A right portion of the sensor 93B described below is disposed between the driven rollers 88C and 88D and between the roller portions 852C and 852D in the front-rear direction.

When viewed in the direction perpendicular to the image forming surface of the medium P, the driven rollers 89A and 89B are arranged with the sensor 94A described below disposed therebetween in the front-rear direction, and the roller portions 862A and 862B are also arranged with the sensor 94A described below disposed therebetween in the front-rear direction.

When viewed in the direction perpendicular to the image forming surface of the medium P, the driven rollers 89C and 89D are arranged with the sensor 94B described below disposed therebetween in the front-rear direction, and the roller portions 862C and 862D are also arranged with the sensor 94B described below disposed therebetween in the front-rear direction.

As described above, in the present exemplary embodiment, when viewed in the direction perpendicular to the image forming surface of the medium P, the driven rollers 87, 88, and 89 and the roller portions 842, 852, and 862 are arranged with the sensors 93 and 94 disposed therebetween as appropriate in the front-rear direction (i.e., the width direction of the medium P).

As illustrated in FIG. 5, the driven rollers 87 and 88 are disposed in the first unit 31. As illustrated in FIG. 13, the driven rollers 87 and 88 are rotatably supported by the plate body 51 such that the outer peripheral surfaces thereof (i.e., surfaces thereof that come into contact with the medium P) project downward through the openings 51B in the plate body 51 of the first unit 31. In other words, the outer peripheral surfaces of the driven rollers 87 and 88 project downward from the transport path surface 51A of the first unit 31, and are in contact with respective ones of the roller portions 842 and 852.

The driven rollers 89 are disposed in the second unit 32. More specifically, similarly to the driven rollers 87 and 88, the driven rollers 89 are rotatably supported by the plate body 61 such that the outer peripheral surfaces thereof (i.e., surfaces thereof that come into contact with the medium P) project downward through the openings 61B in the plate body 61 of the second unit 32. In other words, the outer peripheral surfaces of the driven rollers 89 project downward from the transport path surface 61A of the plate body 61, and are in contact with the roller portions 862.

In the transport unit 80, the driving rollers 84, 85, and 86 are rotated while the medium P is held between the driving rollers 84, 85, and 86 and the driven rollers 87, 88, and 89, so that transporting force is applied to the medium P and that the medium P is transported along the transport path 80A. As illustrated in FIG. 1, the transport path 80A constitutes a portion of the transport path 24 from the heating unit 19 to the image forming unit 14.

The transport unit 80 performs the transportation in the first transporting direction and the transportation in the second transporting direction by changing a rotation direction of the transport members 81, 82, and 83. More specifically, the driving rollers 84, 85, and 86 are driven to rotate forward (counterclockwise in FIG. 1) and the driven rollers 87, 88, and 89 are rotated forward (clockwise in FIG. 1) to transport the medium P in the first transporting direction.

Next, the driving rollers 84, 85, and 86 and the driven rollers 87, 88, and 89 stop to rotate, so that the medium P is stopped. Then, the driving rollers 84, 85, and 86 are rotated backward (clockwise in FIG. 1) and the driven rollers 87, 88, and 89 are rotated backward (counterclockwise in FIG. 1) to transport the medium P in the second transporting direction. Thus, the rotation directions of the driving rollers 84, 85, and 86 and the driven rollers 87, 88, and 89 are reversed to switch between the transportation of the medium P in the first transporting direction and the transportation of the medium P in the second transporting direction, and the medium P is in the stopped state between the transportation of the medium P in the first transporting direction and the transportation of the medium P in the second transporting direction.

The transport unit 80 has the transport path surfaces 41A, 51A, 61A, and 71A that face one and the other sides of the medium P in the stopped state (see FIG. 1). The transport path surface 41A, which is the upper surface of the plate body 41 of the detection device body 40 as described above (see FIGS. 5 and 13), faces the lower surface of the medium P in the stopped state and guides the lower surface of the medium P. In the transport unit 80, the medium P is stopped on the transport path 80A illustrated in FIG. 1.

The transport path surface 41A is flat over the entire area of the medium P. More specifically, the transport path surface 41A is flat over the entire area of the medium P having a maximum size that may be used in the image forming apparatus 10. Still more specifically, the transport path surface 41A is larger than the medium P having the maximum size in both the transporting direction and the width direction. The transport path surface 41A may include regions having projections and recesses. For example, the transport path surface 41A may have projections in regions where members such as the reflection plates 97 are arranged and regions where members such as the roller portions 842, 852, and 862 project. In addition, for example, the transport path surface 41A may have recesses in regions where holes, such as the openings 416B, grooves, and dents are formed. In addition, the transport path surface 41A may have regions in which at least recesses or projections are formed by forming ribs or drawing the metal plate to reduce the contact area between the transport path surface 41A and the medium P. Thus, the expression “flat surface” includes flat surfaces having regions where projections and recesses are present.

The transport path surface 51A, which is the lower surface of the plate body 51 of the first unit 31 as described above (see FIGS. 7A, 7B, and 13), faces the upper surface of the medium P in the stopped state and guides the upper surface of the medium P. The transport path surface 61A, which is the lower surface of the plate body 61 of the second unit 32 as described above (see FIGS. 7A and 7B), faces the upper surface of the medium P in the stopped state and guides the upper surface of the medium P. The transport path surface 71A, which is the lower surface of the plate body 71 of the opening-closing portion 70 as described above (see FIG. 10), faces the upper surface of the medium P in the stopped state and guides the upper surface of the medium P.

A passage surface composed of the transport path surfaces 51A, 61A, and 71A and disposed above the medium P in the stopped state is flat over the entire area of the medium P. More specifically, the passage surface is flat over the entire area of the medium P having the maximum size that may be used in the image forming apparatus 10.

The transport members 81 and 82 have a function of transporting the medium P as described above, but may also be regarded as examples of a support unit that supports the medium P transported by the transport member 83. More specifically, the driving rollers 84 and 85 support the lower surface of the medium P with the roller portions 842 and 852 that project upward from the transport path surface 41A of the detection device body 40. The driven rollers 87 and 88 press the medium P against the driving rollers 84 and 85 with the outer peripheral surfaces thereof that project downward from the transport path surface 51A of the first unit 31.

Thus, in the transport unit 80, the driving rollers 84 and 85 support the lower surface of the medium P at a position above the transport path surface 41A of the detection device body 40 (i.e., at a position separated from the transport path surface 41A).

The transport members 81 and 82 are disposed at positions corresponding to media P having different transporting-direction dimensions. More specifically, the transport member 81 is disposed at a position such that the transport member 81 is capable of supporting a downstream edge portion of a medium P having a maximum size (more specifically, a maximum transporting-direction dimension) that may be used in the image forming apparatus 10 in the transporting direction. The transport member 82 is disposed at a position such that the transport member 82 is capable of supporting a downstream edge portion of a medium P having a minimum size (more specifically, a minimum transporting-direction dimension) that may be used in the image forming apparatus 10 in the transporting direction.

Detection Unit 90

The detection unit 90 has a function of detecting edge portions of the medium P in the stopped state. As illustrated in FIGS. 5 and 6, the detection unit 90 includes the sensors 91 (91A and 91B), 92 (92A and 92B), 93 (93A and 93B), and 94 (94A and 94B) (hereinafter referred to as sensors 91 to 94), the sensor substrates 95 (95A to 95H), wires 96 (see FIG. 6), and the reflection plates 97 (see FIG. 5).

The sensors 91 to 94 are examples of a sensing unit that senses an edge portion of the medium P. The sensors 93 and 94 are also examples of a pair of sensing units. More specifically, the sensors 91 to 94 are non-contact sensors that sense the edge portions of the medium P without coming into contact with the medium P. Still more specifically, the sensors 91 to 94 are optical sensors that use light emitted toward the medium P. Still more specifically, the sensors 91 to 94 are reflective optical sensors that sense the edge portions of the medium P by sensing light emitted toward and reflected by the medium P. Still more specifically, each of the sensors 91 to 94 is a reflective optical sensor including plural light emitting elements and plural light receiving elements arranged in a longitudinal direction thereof.

As illustrated in FIGS. 5 and 6, the numbers of the sensors 91 to 94 are more than one. More specifically, the sensors 91 to 94 are provided in pairs (the numbers thereof are two), as indicated by the letters A and B added to the reference numerals thereof in the drawings. In other words, the detection unit 90 includes a total of eight sensors. Thus, the detection unit 90 includes four or more sensors.

Each of the sensors 91 to 94 extends in one direction and has a longitudinal direction and a transverse direction. More specifically, the sensors 91 and 92 extend in the front-rear direction (that is, in the width direction of the medium P). The sensors 93 and 94 extend in the left-right direction (that is, in the first transporting direction or the second transporting direction).

Each of the sensors 91 to 94 includes plural light emitting elements and plural light receiving elements arranged in the longitudinal direction thereof, and thereby has a light-emitting region and a light-receiving region extending in the longitudinal direction thereof. Each of the sensors 91 to 94 senses an edge portion of the medium P at the boundary between a portion of the light-receiving region that is receiving light and a portion of the light-receiving region that is not receiving light, and information of coordinates thereof (which corresponds to position information described below) is transmitted, for example, from the corresponding sensor substrate 95 to the control device 160. The sensors 91 to 94 are capable of sensing the edge portions of the medium P in the light-emitting regions thereof, and therefore the light-emitting regions correspond to sensing regions in which the edge portions of the medium P may be sensed. The sensing regions have longitudinal directions along the longitudinal directions of the sensors 91 to 94 and transverse directions along the transverse directions of the sensors 91 to 94. The sizes of the sensing regions are equal to or smaller than the sizes of the sensors 91 to 94.

The sensors 91 are arranged in a front region of the detection device 30. The sensors 91 are positioned to face one side edge portion (one edge portion in the width direction) of the medium P in the stopped state. More specifically, when viewed in the direction perpendicular to the image forming surface of the medium P, the sensors 91 are arranged to extend in the longitudinal direction thereof to cross the one side edge portion of the medium P in the stopped state, and sense the one side edge portion. Still more specifically, when viewed in the direction perpendicular to the image forming surface of the medium P, the sensors 91 are arranged such that the detection regions thereof extend in the longitudinal direction thereof to cross the one side edge portion of the medium P in the stopped state at the predetermined position. In other words, the sensors 91 are arranged such that the one side edge portion of the medium P in the stopped state at the predetermined position is positioned between one and the other ends of the detection region of each sensor 91 in the longitudinal direction thereof.

The sensors 92 are arranged in a rear region of the detection device 30. The sensors 92 are positioned to face another side edge portion (other edge portion in the width direction) of the medium P in the stopped state. More specifically, when viewed in the direction perpendicular to the image forming surface of the medium P, the sensors 92 are arranged to extend in the longitudinal direction thereof to cross the other side edge portion of the medium P in the stopped state, and sense the other side edge portion. Still more specifically, when viewed in the direction perpendicular to the image forming surface of the medium P, the sensors 92 are arranged such that the detection regions thereof extend in the longitudinal direction thereof to cross the other side edge portion of the medium P in the stopped state at the predetermined position. In other words, the sensors 92 are arranged such that the other side edge portion of the medium P in the stopped state at the predetermined position is positioned between one and the other ends of the detection region of each sensor 92 in the longitudinal direction thereof.

The sensors 91A and 92A are arranged next to each other in the front-rear direction in a downstream region of the detection device 30 in the transporting direction (more specifically, in the first unit 31).

The sensors 91B and 92B are arranged next to each other in the front-rear direction in an upstream region of the detection device 30 in the transporting direction (more specifically, in the second unit 32).

The sensors 93 are arranged in a downstream region of the detection device 30 in the transporting direction (more specifically, a left region of the detection device 30). The sensors 93 are positioned to face the downstream edge portion of the medium P in the stopped state in the transporting direction. More specifically, when viewed in the direction perpendicular to the image forming surface of the medium P, the sensors 93 are arranged to extend in the longitudinal direction thereof to cross the downstream edge portion of the medium P in the stopped state in the transporting direction, and sense the downstream edge portion of the medium P. Still more specifically, when viewed in the direction perpendicular to the image forming surface of the medium P, the sensors 93 are arranged such that the detection regions thereof extend in the longitudinal direction thereof to cross the downstream edge portion of the medium P in the stopped state at the predetermined position in the transporting direction. In other words, the sensors 93 are arranged such that the downstream edge portion of the medium P in the stopped state at the predetermined position in the transporting direction is positioned between one and the other ends of the detection region of each sensor 93 in the longitudinal direction thereof.

The sensors 94 are arranged in an upstream region of the detection device 30 in the transporting direction (more specifically, a right region of the detection device 30). The sensors 94 are positioned to face the upstream edge portion of the medium P in the stopped state in the transporting direction. More specifically, when viewed in the direction perpendicular to the image forming surface of the medium P, the sensors 94 are arranged to extend in the longitudinal direction thereof to cross the upstream edge portion of the medium P in the stopped state in the transporting direction, and sense the upstream edge portion of the medium P. Still more specifically, when viewed in the direction perpendicular to the image forming surface of the medium P, the sensors 94 are arranged such that the detection regions thereof extend in the longitudinal direction thereof to cross the upstream edge portion of the medium P in the stopped state at the predetermined position in the transporting direction. In other words, the sensors 94 are arranged such that the upstream edge portion of the medium P in the stopped state at the predetermined position in the transporting direction is positioned between one and the other ends of the detection region of each sensor 94 in the longitudinal direction thereof.

The sensors 93A and 94A are arranged next to each other in the left-right direction in a front region of the detection device 30. The sensors 93B and 94B are arranged next to each other in the left-right direction in a rear region of the detection device 30.

As described above, the numbers of the sensors 91 to 94 of the detection unit 90 are more than one, and each edge portion of the medium P is detected by plural sensors. Thus, the detection unit 90 includes plural sensors that detect one edge portion of the medium P.

In the present exemplary embodiment, the sensors 91 and 92 are disposed between the sensors 93 and 94 in side view. More specifically, the sensors 91 and 92 are disposed upstream of the sensors 93 and downstream of the sensors 94 in the transporting direction. Here, "side view" means a view in a direction from one side toward the other side of the medium P in the width direction.

The numbers of the sensor substrates 95, the wires 96, and the reflection plates 97 are more than one. More specifically, the numbers of the sensor substrates 95, the wires 96, and the reflection plates 97 are equal to the number of the sensors 91 to 94. In the present exemplary embodiment, the numbers of the wires 96 and the reflection plates 97 are eight. In addition, the number of the sensor substrates 95 is also eight, as indicated by the letters A, B, C, D, E, F, G, and H added to the reference numeral thereof.

The eight sensor substrates 95 are driving substrates that drive respective ones of the eight sensors 91 to 94. The sensor substrates 95A, 95B, 95C, and 95D are attached to the attachment plate 59A of the substrate support 59 and arranged in that order in the rearward direction. The sensor substrates 95E, 95F, 95G, and 95H are attached to the attachment plate 69A of the substrate support 69 and arranged in that order in the rearward direction.

The eight sensor substrates 95 are disposed close to respective ones of the eight sensors 91 to 94. More specifically, each of the sensors 91 to 94 is driven by one of the eight sensor substrates 95 that is closest thereto.

The eight wires 96 are connection lines that electrically connect the eight sensor substrates 95 to the respective ones of the eight sensors 91 to 94. The eight wires 96 are not bundled together, and are arranged separately from each other. In other words, the eight wires 96 are arranged such that none of the wires 96 extends along the other wires 96. The eight wires 96 are arranged so as not to cross each other.

The eight reflection plates 97 are arranged on the transport path surface 41A of the plate body 41 of the detection device body 40 to face respective ones of the eight sensors 91 to 94. In consideration of a case in which the medium P is a white paper sheet, for example, the reflection plates 97 are colored in black, which has a relatively large difference in reflectance from white.

In the present exemplary embodiment, the sensors 91A, 92A, 93A, and 93B and the sensor substrates 95A, 95B, 95C, and 95D are provided in the first unit 31. The wires 96 that electrically connect the sensors 91A, 92A, 93A, and 93B to the sensor substrates 95A, 95B, 95C, and 95D, respectively, are also provided in the first unit 31.

In addition, in the present exemplary embodiment, the sensors 91B, 92B, 94A, and 94B and the sensor substrates 95E, 95F, 95G, and 95H are provided in the second unit 32. The wires 96 that electrically connect the sensors 91B, 92B, 94A, and 94B to the sensor substrates 95E, 95F, 95G, and 95H, respectively, are also provided in the second unit 32. Thus, the sensors 91 to 94 are provided in the first unit 31 and the second unit 32, and sense the edge portions of the medium P in the stopped state from above the medium P. Accordingly, adhesion of foreign matter, such as paper dust, to the sensors 91 to 94 is reduced compared to when the sensors 91 to 94 sense the edge portions of the medium P in the stopped state from below the medium P.

Pressing Members 110

The pressing members 110 (110A, 110B, 110C, and 110D) illustrated in FIGS. 12 and 13 are members that press an edge portion of the medium P in the stopped state, and are examples of a support unit that support the medium P. Here, to press an edge portion of the medium P means to limit the movement of the edge portion of the medium P from above and below the medium P.

As illustrated in FIGS. 12 and 13, plural pressing members 110 are provided. More specifically, in the present exemplary embodiment, four pressing members 110 are provided, as indicated by the letters A, B, C, and D added to the reference numeral thereof in FIG. 12. The pressing members 110 are composed of plate-shaped elastic members, such as resin films.

As illustrated in FIG. 13, the pressing members 110A and 110B are disposed between the transport members 81 and 82 in side view. In addition, as illustrated in FIG. 12, the pressing members 110A and 110B are arranged such that the sensor 93A is disposed therebetween in the front-rear direction when viewed in the direction perpendicular to the image forming surface of the medium P.

As illustrated in FIG. 13, the pressing members 110C and 110D are disposed downstream of the transport member 81 in the transporting direction in side view. In addition, as illustrated in FIG. 12, the pressing members 110C and 110D are arranged such that the sensor 93A is disposed therebetween in the front-rear direction when viewed in the direction perpendicular to the image forming surface of the medium P.

Upstream end portions of the pressing members 110A, 110B, 110C, and 110D in the transporting direction (i.e., right end portions) are attached to the transport path surface 41A of the detection device body 40, and downstream portions of the pressing members 110A, 110B, 110C, and 110D in the transporting direction (i.e., left portions) are pressed against the transport path surface 51A of the first unit 31 by elastic force thereof. Thus, the pressing members 110A, 110B, 110C, and 110D retain an edge portion (more specifically, a downstream edge portion) of the medium P in the stopped state by pressing the medium P transported between the transport path surface 51A and the pressing members 110A, 110B, 110C, and 110D against the transport path surface 51A.

Although not illustrated in FIGS. 12 and 13 and other figures, in the present exemplary embodiment, additional pressing members 110 are arranged in a manner similar to that described above such that the sensor 93B is disposed therebetween in the front-rear direction when viewed in the direction perpendicular to the image forming surface of the medium P.

As described above, in the present exemplary embodiment, the pressing members 110 are arranged such that the sensors 93 are disposed therebetween in the front-rear direction as appropriate when viewed in the direction perpendicular to the image forming surface of the medium P.

Control Device 160

Figure 14:
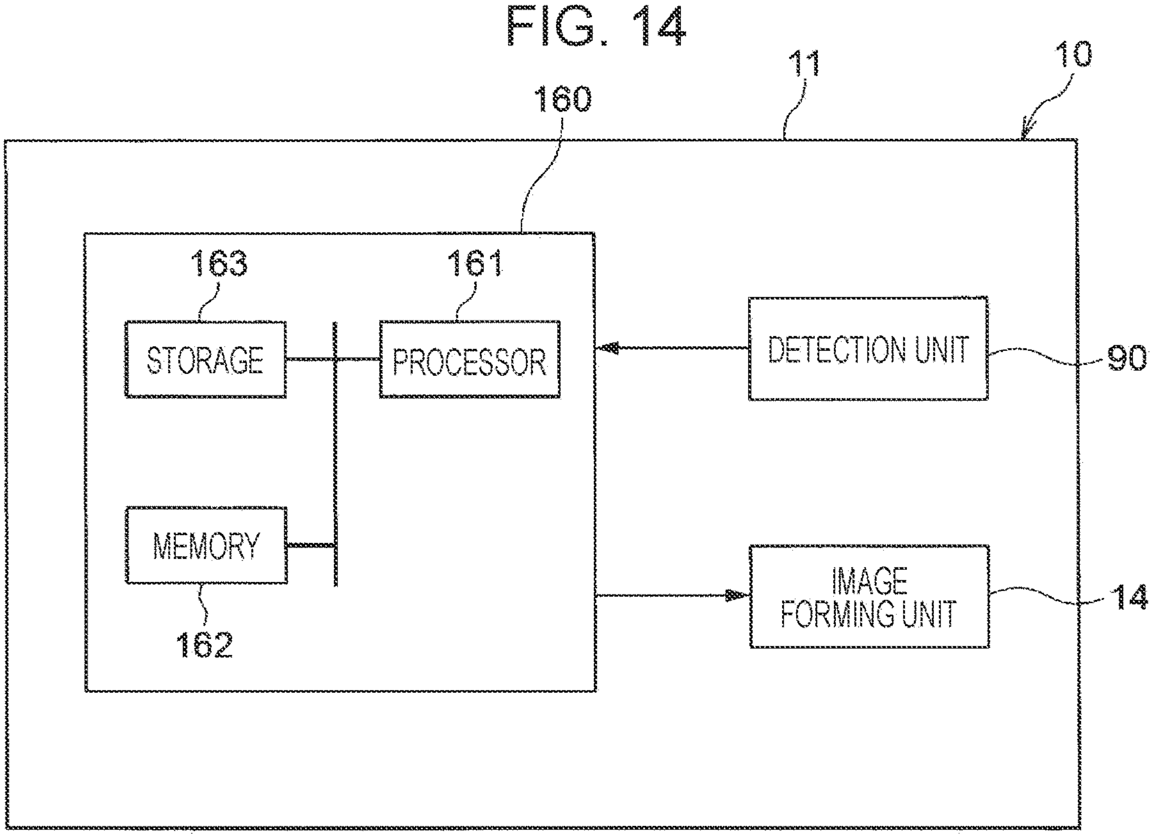
FIG. 14 is a block diagram illustrating an example of a hardware configuration of a control device according to the exemplary embodiment.

The structure of the control device 160 will now be described. The control device 160 has a function of controlling the operations of components of the image forming apparatus 10 including components of the detection device 30. The control device 160 also has a function of determining the dimensions of the medium P based on detection results obtained by the detection unit 90. More specifically, as illustrated in FIG. 14, the control device 160 includes a processor 161, a memory 162, and a storage 163.

The term "processor" refers to hardware in a broad sense. Examples of the processor 161 include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

The storage 163 stores various programs including a control program 163A (see FIG. 15) and various data. The storage 163 may be realized as a recording device, such as a hard disk drive (HDD), a solid state drive (SSD), or a flash memory.

The memory 162 is a work area that enables the processor 161 to execute various programs, and temporarily stores various programs or various data when the processor 161 performs a process. The processor 161 reads various programs including the control program 163A into the memory 162 from the storage 163, and executes the programs by using the memory 162 as a work area.

Figure 15:
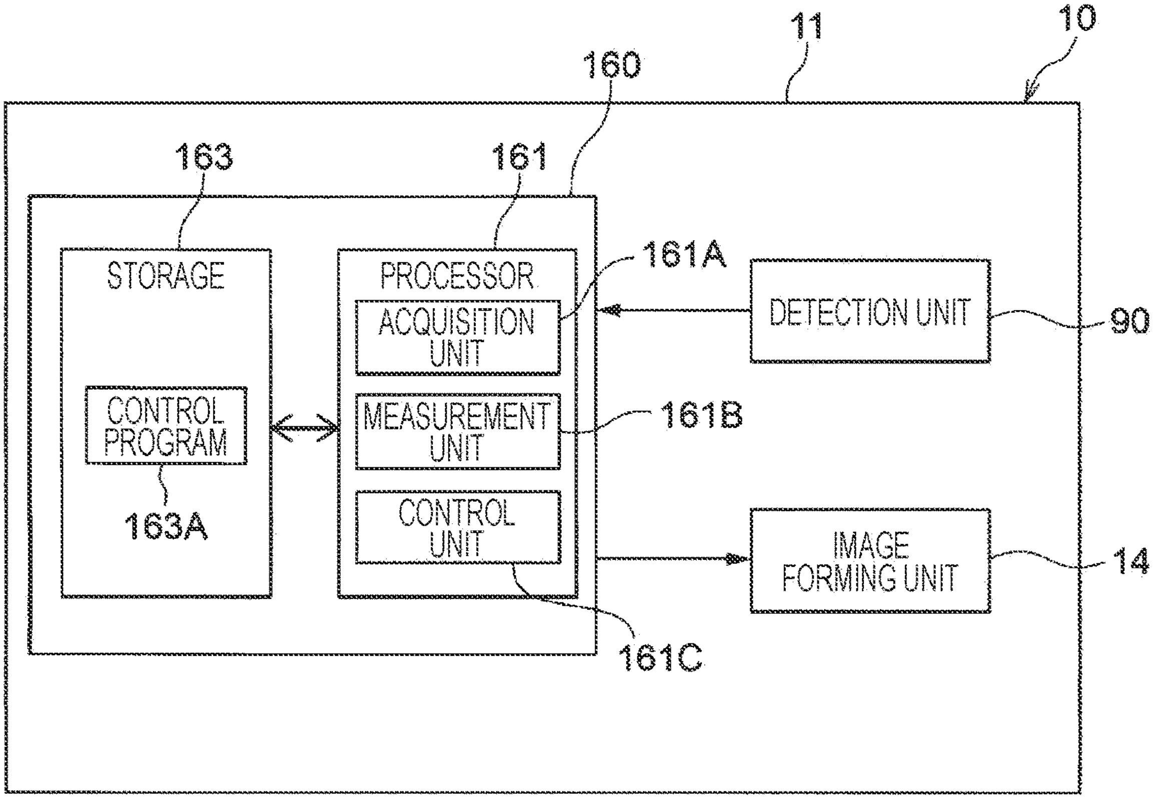
FIG. 15 is a block diagram illustrating an example of a functional configuration of a processor included in the control device according to the exemplary embodiment.

In the control device 160, the processor 161 executes the control program 163A to realize various functions. A functional configuration realized by cooperation of the processor 161, which serves as a hardware resource, and the control program 163A, which serves as a software resource, will now be described. FIG. 15 is a block diagram illustrating the functional configuration of the processor 161.

Referring to FIG. 15, in the control device 160, the processor 161 executes the control program 163A to function as an acquisition unit 161A, a measurement unit 161B, and a control unit 161C.

The acquisition unit 161A acquires detection information obtained by the detection unit 90 that detects the edge portions of the medium P. The detection information includes position information representing the positions of the edge portions of the medium P. More specifically, the position information of the upstream and downstream edge portions of the medium P in the transporting direction represents positions in the transporting direction, and the position information of the side edge portions of the medium P represents positions in the width direction of the medium P. For example, when each of the sensors 91 to 94 senses the corresponding edge portion of the medium P at the boundary between a portion of the light-receiving region that is receiving light and a portion of the light-receiving region that is not receiving light, information of coordinates thereof is acquired by the acquisition unit 161A as the position information representing the position of the edge portion of the medium P.

The measurement unit 161B determines the transporting-direction dimension and the width-direction dimension of the medium P based on the position information acquired by the acquisition unit 161A. The measurement unit 161B determines the transporting-direction dimension of the medium P by, for example, determining the distance between the upstream and downstream edge portions of the medium P from the positions in the transporting direction of the upstream and downstream edge portions of the medium P in the transporting direction. The measurement unit 161B determines the width-direction dimension of the medium P by, for example, determining the distance between the pair of side edge portions of the medium P from the positions in the width direction of the pair of side edge portions of the medium P in the width direction.

For example, the measurement unit 161B determines the width-direction dimension of a downstream portion of the medium P in the transporting direction from the sensing results obtained by the sensors 91A and 92A arranged in the front-rear direction in a downstream region of the detection device 30 in the transporting direction.

The measurement unit 161B determines the width-direction dimension of an upstream portion of the medium P in the transporting direction from the sensing results obtained by the sensors 91B and 92B arranged in the front-rear direction in an upstream region of the detection device 30 in the transporting direction. The measurement unit 161B may determine the width-direction dimension of the medium P as, for example, the average of the width-direction dimension of the downstream portion of the medium P in the transporting direction and the width-direction dimension of the upstream portion of the medium P in the transporting direction.

The measurement unit 161B determines the transporting-direction dimension of one side portion of the medium P in the width direction from the sensing results obtained by the sensors 93A and 94A arranged in the left-right direction in a front region of the detection device 30.

The measurement unit 161B determines the transporting-direction dimension of the other side portion of the medium P in the width direction from the sensing results obtained by the sensors 93B and 94B arranged in the left-right direction in a rear region of the detection device 30. The measurement unit 161B may determine the transporting-direction dimension of the medium P as, for example, the average of the transporting-direction dimension of the one side portion of the medium P in the width direction and the transporting-direction dimension of the other side portion of the medium P in the width direction.

The measurement unit 161B determines the size of the medium P by determining the transporting-direction dimension and the width-direction dimension of the medium P. The measurement unit 161B may determine the inclinations of the one side edge portion, the other side edge portion, the downstream edge portion, and the upstream edge portion from the sensing results obtained by the sensors 91A, 91B, 92A, 92B, 93A, 93B, 94A, and 94B.

Based on the size of the medium P determined by the measurement unit 161B, the control unit 161C adjusts an image to be formed on the medium P whose edge portions have been detected. More specifically, after the edge portions of the medium P are detected by the detection device 30, the control unit 161C adjusts a back image to be formed on the medium P having the detected edge portions based on the size of the medium P determined by the measurement unit 161B. For example, when the size of the medium P determined by the measurement unit 161B is smaller than the size specified as the size of the medium P on which the image is to be formed, the control unit 161C controls the image forming unit 14 to reduce the size of the back image formed by the image forming unit 14.

The adjustment of the back image (example of the second image) performed by the controller 161C may include an adjustment of the position of the back image with respect to the front image (example of the first image), an adjustment of the position of the back image with respect to the medium P on which the front image is formed, or a combination of these adjustments.

Although the control device 160 is disposed in the image forming apparatus 10, the control device 160 is not limited to this. For example, the control device 160 may be disposed in the detection device 30 or in another device that is disposed outside the image forming apparatus 10. The location of the control device 160 is not limited.

Position of Detection Device 30

As described above, the detection device 30 is disposed in the image forming apparatus body 11. Therefore, the image forming apparatus body 11 is an example of a "placement section in which the detection device 30 is disposed". More specifically, the detection device 30 is disposed above the medium storage unit 12 in the vertical direction. As described above, the detection device 30 has a flat shape that extends in the front-rear and left-right directions (more specifically, horizontal directions), and is therefore space-saving in the up-down direction.

The detection device 30 including the transport unit 80 is disposed at a position at which the transportation of the medium P is stopped in the image forming apparatus 10 in which the detection device 30 is disposed. Still more specifically, the detection device 30 including the transport unit 80 is disposed on the transport path 24, which is one of the transport paths of the image forming apparatus 10 on which the medium P is stopped to change the transporting direction of the medium P. More specifically, the transport path 24 is a transport path on which the medium P is stopped to reverse the medium P.

The medium P is reversed by performing a switchback operation on the transport path 24. The switchback operation is an operation of moving the medium P back and forth along the same path. In other words, the switchback operation is an operation of changing the direction of the medium P.

As described above, the transport path 24 is a transport path along which the medium P is transported from the heating unit 19 to the image forming unit 14. The detection device 30 is disposed on the transport path 24 at a location upstream of the supply position 25A, at which a new medium P is supplied toward the image forming unit 14, in the transporting direction. The detection device 30 is disposed above the medium storage unit 12 in the vertical direction.

Removal of Detection Device 30 from Image Forming Apparatus Body 11

As described above, the detection device 30 is removably disposed in the image forming apparatus body 11, which is an example of the placement section. More specifically, the detection device body 40 of the detection device 30 is removable from the image forming apparatus body 11.

In the present exemplary embodiment, the entirety of the detection device 30 including the first unit 31 and the second unit 32 may be removed from the image forming apparatus body 11 by removing the detection device body 40 from the image forming apparatus body 11.

As described above, each of the first unit 31 and the second unit 32 including portions of the transport unit 80 is removable from the detection device body 40. In other words, each of the first unit 31 and second unit 32 is removable from the detection device 30 including the detection device body 40 (more specifically, from a portion of the detection device 30 excluding the first unit 31 and the second unit 32). Therefore, in the present exemplary embodiment, at least a portion of the transport unit 80 is removable from the detection device 30 (more specifically, from a portion of the detection device 30 excluding at least the portion of the transport unit 80, which serves as a removable object).

The first unit 31 and the second unit 32 include the driven rollers 87, 88, and 89, which are examples of a driven member, and are examples of a first portion including a driven member. The detection device body 40 includes driving rollers 84, 85, and 86, which are examples of a rotating member, and is an example of a second portion including a rotating member. Each of the first unit 31 and the second unit 32 is independently removable from the detection device 30 including the detection device body 40.

In addition, in the present exemplary embodiment, each of the first unit 31 and the second unit 32 is removable from the detection device 30 including the detection device body 40 both after and before the detection device 30 is removed from the image forming apparatus body 11.

Therefore, each of the first unit 31 and the second unit 32 is removable from the detection device 30 including the detection device body 40 while the detection device 30 is attached to the image forming apparatus body 11. In other words, each of the first unit 31 and the second unit 32 is removable from the image forming apparatus body 11 while the detection device 30 including the detection device body 40 remains in the image forming apparatus body 11.

In the present exemplary embodiment, the sensors 91A, 92A, 93A, and 93B are provided on the first unit 31 removable from the detection device body 40. In addition, the sensors 91B, 92B, 94A, and 94B are provided on the second unit 32 removable from the detection device body 40. Thus, the sensors 91 to 94 are provided on the first unit 31 and the second unit 32, which are examples of a first portion including a driven member.

The sensors 91A, 91B, 93A, and 93B are examples of a first sensing unit that senses one edge portion of the medium P, and the sensor 92A, 92B, 94A, and 94B are examples of a second sensing unit that senses another edge portion of the medium P that faces the one edge portion. The one edge portion of the medium P and the other edge portion of the medium that faces the one edge portion may be the pair of downstream and upstream edge portions of the medium P in the transporting direction, the pair of side edge portions of the medium P, or both of these pairs.

As illustrated in FIG. 16, the frame 11A disposed in front of the detection device 30 has openings 11D and 11E that allow insertion of both arms of the operator who performs the removing process. A partitioning portion 11F that separates the openings 11D and 11E is provided between the openings 11D and 11E. The openings 11D and 11E are separated from each other in the left-right direction by the partitioning portion 11F, and are arranged next to each other in the left-right direction. Each of the openings 11D and 11E is a long hole that is long in the left-right direction and short in the up-down direction.

The dimension of each of the openings 11D and 11E in the up-down direction is set based on, for example, the average thickness (maximum diameter) of the upper arms of adult males. More specifically, the dimension of each of the openings 11D and 11E in the up-down direction is greater than the average thickness of the upper arms of adult males.

The dimension of each of the openings 11D and 11E in the left-right direction is set based on, for example, the average shoulder width of adult males. More specifically, the dimension of each of the openings 11D and 11E in the left-right direction is greater than the average shoulder width of adult males. Accordingly, each of the openings 11D and 11E allows insertion of both arms of the operator.

Each of the openings 11D and 11E is large enough to allow each of the first unit 31 and the second unit 32 to pass therethrough. More specifically, the dimension of the opening 11D in the up-down direction is greater than the dimension of the first unit 31 in the up-down direction, and the dimension of the opening 11D in the left-right direction is greater than the dimension of the first unit 31 in the left-right direction. The dimension of the opening 11E in the up-down direction is greater than the dimension of the second unit 32 in the up-down direction, and the dimension of the opening 11E in the left-right direction is greater than the dimension of the second unit 32 in the left-right direction.

Accordingly, in an upper region of the detection device 30, the first unit 31 and the second unit 32 are capable of being separated from each other and are individually removable through the openings 11D and 11E. In other words, the first unit 31 and the second unit 32 are removable through different ones of plural openings 11D and 11E. The first unit 31 is an example of a "section in which the first sensing unit is provided", and the second unit 32 is an example of a "section in which the second sensing unit is provided".

Components (for example, the driving rollers 84, 85, and 86, the driven rollers 87, 88, and 89, the sensors 91 to 94, the sensor substrates 95, the wires 96, the reflection plates 97, and the opening-closing portion 70) may be removable from the first unit 31, the second unit 32, and the detection device body 40. This facilitates replacement and maintenance of the components.

In the present exemplary embodiment, removable objects removed from an attachment object (for example, the image forming apparatus body 11, the detection device 30, or the detection device body 40) are attachable to the attachment object.

Operations of Present Exemplary Embodiment

As described above, in the detection device 30, the detection unit 90 detects the edge portions of the medium P in the stopped state.

In the present exemplary embodiment, the detection device 30 including the transport unit 80 is disposed at a position at which the transportation of the medium P is stopped in the image forming apparatus 10 in which the detection device 30 is disposed.

After the medium P has been in the stopped state, the transport unit 80 restarts the transportation of the medium P in the second transporting direction that differs from the first transporting direction before stoppage.

In the present exemplary embodiment, the first transporting direction and the second transporting direction are opposite to each other. When the second transporting direction is a direction that crosses the first transporting direction, for example, it is necessary to provide a transport member for transporting the medium P in the first transporting direction and a transport member for transporting the medium P in the second transporting direction, and a complex structure is required. In contrast, in the present exemplary embodiment, the first transporting direction and the second transporting direction are opposite to each other, and therefore the transportation in the first transporting direction and the transportation in the second transporting direction may be performed by changing the rotation direction of the transport members 81, 82, and 83.

In addition, in the present exemplary embodiment, the transport members 81 and 82 support the medium P transported by the transport member 83. In the present exemplary embodiment, the transport members 81 and 82 are disposed at plural positions corresponding to media P having different transporting-direction dimensions. When the transport unit 80 includes only the transport member 83, edge portions of the media P having different transporting-direction dimensions cannot be supported, and the edge portions of the media P that are not supported by the transport member 83 curve downward. In contrast, in the present exemplary embodiment, the transport members 81 and 82 are disposed at plural positions corresponding to media P having different transporting-direction dimensions.

In the present exemplary embodiment, the driven rollers 87, 88, and 89 and the roller portions 842, 852, and 862 are arranged such that the sensors 93 and 94 are disposed therebetween in the front-rear direction (that is, the width direction of the medium P) as appropriate when viewed in the direction perpendicular to the image forming surface of the medium P. If the driven rollers 87, 88, and 89 and the roller portions 842, 852, and 862 are arranged such that the sensors 93 and 94 are disposed therebetween in the transporting direction as appropriate when viewed in the direction perpendicular to the image forming surface of the medium P, the medium P is supported in a region that is narrow in the front-rear direction, and therefore there is a possibility that the edge portions of the medium P in the front-rear direction will curve downward. In contrast, in the present exemplary embodiment, the driven rollers 87, 88, and 89 and the roller portions 842, 852, and 862 are arranged such that the sensors 93 and 94 are disposed therebetween in the front-rear direction as appropriate when viewed in the direction perpendicular to the image forming surface of the medium P.

In addition, in the present exemplary embodiment, the pressing members 110 press an edge portion of the medium P in the stopped state.

In the present exemplary embodiment, each of the sensors 91 to 94 is disposed to cross the corresponding edge portion of the medium P in the stopped state in the longitudinal direction thereof when viewed in the direction perpendicular to the image forming surface of the medium P.

In addition, in the present exemplary embodiment, when viewed in the direction perpendicular to the image forming surface of the medium P, each of the sensors 91 to 94 is disposed to cross a corresponding one of four edge portions of the medium P, the four edge portions including the downstream and upstream edge portions in the transporting direction and the pair of side edge portions.

In the present exemplary embodiment, the sensors 91 and 92 are positioned between the sensors 93 and the sensors 94 in side view.

In the present exemplary embodiment, the opening-closing portion 70 is disposed in a region that is between the sensors 91A and 92A and the sensors 91A and 92B and in which the sensors 91 to 94 are not disposed.

In the present exemplary embodiment, the detection unit 90 includes plural sensors (for example, the sensors 91A and 91B) that sense one edge portion of the medium P. The plural sensors sense respective positions on the edge portion of the medium P.

In the present exemplary embodiment, the transport path surface 41A is flat over the entire area of the medium P. In addition, a passage surface composed of the transport path surfaces 51A, 61A, and 71A and disposed above the medium P in the stopped state is flat over the entire area of the medium P.

In the present exemplary embodiment, the detection device 30 including the first unit 31 and the second unit 32 is removable from the image forming apparatus body 11. In addition, each of the first unit 31 and the second unit 32 including portions of the transport unit 80 are removable from the detection device body 40.

In the present exemplary embodiment, each of the first unit 31 and the second unit 32 is removable from the detection device 30 including the detection device body 40.

In the present exemplary embodiment, each of the first unit 31 and the second unit 32 is removable from the detection device 30 including the detection device body 40 after the detection device 30 is removed from the image forming apparatus body 11.

The first unit 31 and the second unit 32, which are removable objects, respectively include the driven rollers 87 and 88, and the driven roller 89, which are not required to be connected to members disposed in the image forming apparatus body 11, instead of the driving rollers 84, 85, and 86, which are required to be connected to the above-described rotating portions (not illustrated) disposed in the image forming apparatus body 11.

In the present exemplary embodiment, the sensors 91 to 94 are provided in the first unit 31 and the second unit 32. In other words, the sensors 91 to 94 are collectively arranged in units disposed above the detection device body 40.

In the present exemplary embodiment, as illustrated in FIG. 16, the frame 11A disposed in front of the detection device 30 has openings 11D and 11E that allow insertion of both arms of the operator who performs the removing process.

In the present exemplary embodiment, the first unit 31 and the second unit 32 are capable of being separated from each other and are individually removable through the openings 11D and 11E.

In the present exemplary embodiment, each of the first unit 31 and the second unit 32 is removable through each of the opening 11D and the opening 11E. In other words, the first unit 31 and the second unit 32 are removable through different ones of the openings 11D and 11E.

In addition, in the present exemplary embodiment, the detection device 30 is disposed on the transport path 24 along which the medium P is transported from the heating unit 19 to the image forming unit 14.

In the present exemplary embodiment, the detection device 30 is disposed on the transport path 24 at a location upstream of the supply position 25A, at which a new medium P is supplied toward the image forming unit 14, in the transporting direction.

In the present exemplary embodiment, after the edge portions of the medium P are detected by the detection device 30, the control device 160 adjusts the second image to be formed on the medium P having the detected edge portions based on the size of the medium P determined by the measurement unit 161B.

Modifications of Images Formed on Medium P

Although the front image, which is an example of the first image, is formed on one side of the medium P, and the back image, which is an example of the second image, is formed on the other side of the medium P in the present exemplary embodiment, the images are not limited to this. An example of the second image may be formed on the side of the medium P on which the first image is formed.

Although the front image, which is an example of the first image, and the back image, which is an example of the second image, are formed by the same image forming unit 14 in the present exemplary embodiment, the front image and the back image may be formed by different image forming units.

In addition, an example of the first image may be an image formed by another unit (for example, an image forming unit provided separately from the image forming unit 14 in the image forming apparatus 10 or an image forming apparatus other than the image forming apparatus 10) in place of or in addition to an image formed by the image forming unit 14. An example of the first image may be any image formed on the medium P before the edge portions of the medium P are sensed.

Modifications of Transport Unit 80

Although the rotating portions (not illustrated) connected to the connecting portions 843, 853, and 863 of the driving rollers 84, 85, and 86, the driving units (not illustrated), such as motors, that rotate the rotating portions, and the controller (not illustrated) that controls the driving units are provided in the image forming apparatus body 11 in the present exemplary embodiment, the arrangement thereof is not limited to this. The rotating portions, the driving units, and the controller may be provided in the detection device 30.

Although the driving rollers 84, 85, and 86 are used as examples of the rotating member in the present exemplary embodiment, the rotating member is not limited to this. Examples of the rotating member also include rollers, belts, and wheels that are used individually or in combination with each other. When a belt is used as an example of the rotating member, the belt is wrapped around plural rollers and rotated by driving force received from the rollers. An example of the rotating member may be a member that is not driven to rotate as long as the rotating member rotates.

Although the driven rollers 87, 88, and 89 are used as examples of the driven member in the present exemplary embodiment, the driven member is not limited to this. Examples of the driven member also include rollers, belts, and wheels, and any member driven by the rotating member may be used.

Although the driving rollers 84, 85, and 86, which are examples of the rotating member, are disposed in the detection device body 40 and the driven rollers 87, 88, and 89, which are examples of the driven member, are disposed in the first unit 31 and the second unit 32 disposed above the detection device body 40 in the present exemplary embodiment, the arrangement is not limited to this. For example, the driven members, such as the driven rollers 87, 88, and 89, may be disposed in the detection device body 40, and the rotating members, such as the driving rollers 84, 85, and 86, may be disposed in the first unit 31 and the second unit 32. In this case, the detection device body 40 is an example of the first portion, and each of the first unit 31 and the second unit 32 is an example of the second portion.

Although the transport members 81 and 82 function as examples of the support unit in the present exemplary embodiment, the support unit is not limited to this. For example, only the driving rollers 84 and 85 disposed in a lower region may be provided as examples of the support unit. The driving rollers 84 and 85, which are examples of the support unit, may be driven rollers or non-rotating rollers. An example of the support unit may be any member that provides a support above the transport path surface 41A of the detection device body 40, and may be a film; a projection, such as a rib; a driving, driven, or non-rotating belt; a roller; or a wheel. An example of the support unit may support the medium P by blowing gas, such as air, or by suction.

In the present exemplary embodiment, the transport unit 80 may be structured such that the transport unit 80 includes only the transport member 83 as a transport member. In other words, the transport unit 80 may be structured such that the transport members 81 and 82 are not included therein.

Although the driven rollers 87, 88, and 89 and the roller portions 842, 852, and 862 are arranged such that the sensors 93 and 94 are disposed therebetween in the front-rear direction (that is, the width direction of the medium P) as appropriate when viewed in the direction perpendicular to the image forming surface of the medium P in the present exemplary embodiment, the arrangement is not limited to this. For example, the driven rollers 87, 88, and 89 and the roller portions 842, 852, and 862 may be arranged such that the sensors 93 and 94 are disposed therebetween in the transporting direction as appropriate when viewed in the direction perpendicular to the image forming surface of the medium P. Alternatively, the driven rollers 87, 88, and 89 and the roller portions 842, 852, and 862 may be arranged such that the sensors 93 and 94 are not disposed therebetween.

Although the first transporting direction, which is an example of the first direction, is leftward and the second transporting direction, which is an example of the second direction, is rightward in the present exemplary embodiment, the first and second directions are not limited to this. The first and second directions may be, for example, forward, rearward, upward, and downward directions, and may be various directions.

Although the second transporting direction, which is an example of the second direction, is a direction opposite to the first transporting direction, the second direction is not limited to this. For example, an example of the second direction may be a direction that crosses the first transporting direction, and may be any direction that differs from the first transporting direction. When the second direction is a direction that crosses the first transporting direction, the detection device 30 may be configured to reverse the medium P by a Mobius turn method. The Mobius turn method is a method of reversing the medium P by turning the medium P plural times so that the orientation of the medium P is changed in steps of 90 degrees when viewed in the direction perpendicular to the image forming surface of the medium P. An example of the second direction may be, for example, the same as the first transporting direction.

Modifications of Pressing Members 110

Although the pressing members 110 are arranged such that the sensors 93 are disposed therebetween in the front-rear direction as appropriate when viewed in the direction perpendicular to the image forming surface of the medium P in the present exemplary embodiment, the pressing members 110 are not limited to this. The pressing members 110 may be arranged such that the sensors 93 are disposed therebetween in the transporting direction as appropriate when viewed in the direction perpendicular to the image forming surface of the medium P. Alternatively, the pressing members 110 may be arranged such that the sensors 93 are not disposed therebetween. For example, the pressing members 110 may be positioned to face the sensors 93 within areas in which sensing by the sensors 93 is not affected, or be arranged at positions shifted from the positions at which the pressing members 110 face the sensors 93.

Although the pressing members 110 press the downstream edge portion of the medium P sensed by the sensors 93 in the present exemplary embodiment, the pressing members 110 may be configured to press one side edge portion, the other side edge portion, and the upstream edge portion of the medium P sensed by the sensors 91, 92, and 94, respectively, instead of or in addition to the downstream edge portion. Since the pressing members 110 are required only to press the edge portions of the medium P that are sensed, when the medium P has an edge portion that is not sensed, no pressing members 110 are required for that edge portion.

Examples of the support unit are not limited to the pressing members 110. An example of the support unit may be any member that provides a support above the transport path surface 41A of the detection device body 40, and may be a film; a projection, such as a rib; a driving, driven, or non-rotating roller; a belt; a roller; or a wheel. An example of the support unit may support the medium P by blowing gas, such as air, or by suction.

In the present exemplary embodiment, the structure may be such that no pressing members 110 are provided and that only the transport members 81 and 82 are provided as examples of the support unit.

Modifications of Opening-Closing Portion 70

Although the opening-closing portion 70 is disposed in a region that is between the sensors 91A and 92A and the sensors 91B and 92B and in which the sensors 91 to 94 are not disposed in the present exemplary embodiment, the opening-closing portion 70 is not limited to this. For example, the opening-closing portion 70 may be disposed in a region in which the sensors 93 and 94 are not disposed and be opened and closed together with the sensors 91 and 92. In this case, the opening-closing portion 70 needs to be sufficiently accurately positioned so that the sensing accuracies of the sensors 91 and 92 are not affected.

Alternatively, the detection device 30 may be structured such that the opening-closing portion 70 is not provided and that the opening 77 at which the transport path 80A (see FIG. 1) of the transport unit 80 is exposed cannot be covered and uncovered.

Modifications of Detection Unit 90

Although reflective optical sensors are used as the sensors 91 to 94 in the present exemplary embodiment, the sensors 91 to 94 are not limited to this. For example, the sensors 91 to 94 may be transmissive optical sensors. An example of a sensing unit may sense an edge portion of the medium P by coming into contact with the edge portion of the medium P, and various sensing units may be used. The sensing unit that senses the edge portion of the medium P by coming into contact with the edge portion of the medium P may, for example, include a contact member (for example, a guide member) that comes into contact with a side edge portion of the medium P. An example of the sensing unit may be a camera that senses the edge portions of the medium P by capturing an image of the medium P. Also when the dimensions of the medium P are determined from the image captured by the camera, it can be said that the edge portions of the medium P are sensed because the dimensions are distances between the edge portions of the medium P.

Although the sensors 91 to 94 are arranged to cross the edge portions of the medium P in the stopped state in the longitudinal directions thereof when viewed in the direction perpendicular to the image forming surface of the medium P in the present exemplary embodiment, the sensors 91 to 94 are not limited to this. For example, the sensors 91 to 94 may be arranged to cross the edge portions of the medium P in the transverse directions thereof. Alternatively, sensors having no longitudinal directions (for example, sensors having a square shape when viewed in the direction perpendicular to the image forming surface of the medium P) may be used as the sensors 91 to 94.

Although the detection unit 90 is structured such that the edge portions of the medium P are each sensed by plural sensors in the present exemplary embodiment, the detection unit 90 is not limited to this. For example, the edge portions of the medium P may each be sensed by a single sensor.

Although the sensors 91 to 94 are provided in the first unit 31 and the second unit 32 in the present exemplary embodiment, the sensors 91 to 94 are not limited to this. For example, the sensors 91 and 93 may be provided in the detection device body 40, and the sensors 92 and 94 may be provided in the first unit 31 and the second unit 32.

Although the sensors 91 to 94 that sense the respective ones of the four edge portions of the medium P are provided in the present exemplary embodiment, the structure is not limited to this as long as at least one of the sensors 91 to 94 is provided.

Modifications of Position of Detection Device 30

Although the detection device 30 is disposed in the image forming apparatus body 11 in the present exemplary embodiment, the detection device 30 is not limited to this. The detection device 30 may be disposed outside the image forming apparatus body 11. When the detection device 30 is disposed outside the image forming apparatus body 11, the detection device 30 may be disposed directly on the image forming apparatus body 11 or be disposed indirectly on the image forming apparatus body 11 with another device or the like disposed therebetween. The detection device 30 may be disposed in another device that is disposed on the image forming apparatus body 11. In this case, the other device is an example of the placement section. The detection device 30 may operate in association with or in response to the operation of components of the image forming apparatus body 11 as necessary.

Although the detection device 30 is disposed on the transport path 24 (more specifically, the transport path 80A) at a location upstream of the supply position 25A, at which a new medium P is supplied toward the image forming unit 14, in the transporting direction in the present exemplary embodiment, the detection device 30 is not limited to this. For example, in place of or in addition to the detection device 30 disposed on the transport path 24 (more specifically, the transport path 80A), a detection device 30 may be disposed downstream of the transport path 80A and upstream of the supply position 25A in the transporting direction. In this structure, for example, the detection device 30 is disposed at a position at which the medium P is stopped to provide an interval between the medium P and another medium P that is supplied from the medium storage unit 12 to the supply position 25A. In this structure, for example, the transport unit 80 stops the transportation of the medium P on which the front image is formed in the first transporting direction and, after the medium P has been in the stopped state, restarts the transportation of the medium P in the second transporting direction, which is the same as the first transporting direction, toward the image forming unit 14 (more specifically, toward the transfer position TA). In this structure, the detection device 30 disposed on the transport path 80A may be omitted, and the transport path 24 may be structured as a transport path that does not reverse the medium P. In this structure, an image that serves as an example of the second image is formed on one side (front side) of the medium P on which the front image (example of the first image) is formed. Thus, the second image may be an image formed on the side on which the first image is formed.

In addition, for example, in place of or in addition to the detection device 30 disposed on the transport path 24 (more specifically, the transport path 80A), a detection device 30 may be disposed downstream of the supply position 25A in the transporting direction. In this structure, for example, the detection device 30 is disposed at a position at which the medium P is stopped to adjust the time at which the medium P is transported to the image forming unit 14 (more specifically, the transfer position TA). In this structure, for example, the transport unit 80 stops the transportation of the medium P on which the front image is formed in the first transporting direction and, after the medium P has been in the stopped state, restarts the transportation of the medium P in the second transporting direction, which is the same as the first transporting direction, toward the image forming unit 14 (more specifically, toward the transfer position TA).

Modifications of Removal of Detection Device 30 from Image Forming Apparatus Body 11 Although the entirety of the detection device 30 including the first unit 31 and the second unit 32 is removable from the image forming apparatus body 11 in the present exemplary embodiment, the detection device 30 is not limited to this. In addition, although each of the first unit 31 and the second unit 32 including portions of the transport unit 80 is removable from the detection device body 40, the first unit 31 and the second unit 32 are not limited to this. For example, the transport unit 80 of the detection device 30 may include at least a portion that is not removable from the detection device 30. The detection device 30 may have a structure such that the detection device 30 is not removable from the image forming apparatus body 11.

Although each of the first unit 31 and the second unit 32 is removable from the image forming apparatus body 11 while the detection device body 40 remains in the image forming apparatus body 11 in the present exemplary embodiment, the first unit 31 and the second unit 32 are not limited to this. For example, the first unit 31, the second unit 32, and the detection device body 40 may be removable from the image forming apparatus body 11 only when the first unit 31, the second unit 32, and the detection device body 40 are removed together.

Although each of the first unit 31 and the second unit 32 is removable from the detection device 30 after the entirety of the detection device 30 including the first unit 31 and the second unit 32 is removed from the image forming apparatus body 11 in the present exemplary embodiment, the first unit 31 and the second unit 32 are not limited to this. For example, the first unit 31 and the second unit 32 may be structured such that each of the first unit 31 and the second unit 32 is removable only when the detection device 30 remains in the image forming apparatus body 11.

Although each of the first unit 31 and the second unit 32 is removable from the detection device 30 including the detection device body 40 in the present exemplary embodiment, the opening-closing portion 70, the first unit 31, and the second unit 32 may be removable together from the detection device 30 including the detection device body 40. In this case, the opening-closing portion 70 is supported by the first unit 31 and the second unit 32.

Although each of the openings 11D and 11E allows insertion of both arms of the operator in the present exemplary embodiment, the openings 11D and 11E are not limited to this. For example, each of the openings 11D and 11E may allow insertion of one arm of the operator. In other words, the two openings 11D and 11E may allow insertion of the respective arms of the operator. Alternatively, the openings 11D and 11E may only allow insertion of the hands of the operator.

It is not necessary that the operator only use their hands to remove the detection device 30, the first unit 31, and the second unit 32, and a jig may also be used. When a jig is used, even if, for example, the centers of gravity of the removable objects are close to the rear (that is, the back) of the image forming apparatus body 11, the removable objects may be removed while being supported with the jig at positions closer to the centers of gravity than when the operator only uses their hands. Therefore, removal of the removable objects is facilitated. In this case, the openings 11D and 11E may be any openings capable of receiving the jig.

Although the first unit 31 and the second unit 32 are capable of being separated from each other and are individually removable through the openings 11D and 11E in the present exemplary embodiment, the first unit 31 and the second unit 32 are not limited to this. For example, the first unit 31 and the second unit 32 may be removable through the openings 11D and 11E only when the first unit 31 and the second unit 32 are removed together.

Although the first unit 31 and the second unit 32 are removable through different ones of the openings 11D and 11E in the present exemplary embodiment, the first unit 31 and the second unit 32 are not limited to this. For example, the first unit 31 and the second unit 32 may be removable only through the same one of the openings 11D and 11E.

Although the frame 11A is a component of the image forming apparatus body 11 in the present exemplary embodiment, the frame 11A is not limited to this, and may be a component of the detection device 30.

The present disclosure is not limited to the above-described exemplary embodiment, and various modifications, alterations, and improvements are possible without departing from the spirit of the present disclosure. For example, the above-described modifications may be applied in combinations with each other as appropriate.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. A detection device comprising:

a transporter that stops transportation of a medium on which a first image is formed, the transporter restarting the transportation of the medium toward an imager after the medium has been in a stopped state, the imager forming a second image on the medium; and a detector that detects an edge portion of the medium while the medium is in the stopped state, wherein the transporter stops the transportation of the medium in a predetermined transporting direction, and wherein the detector includes:

a pair of sensors, each sensor sensing one of a downstream edge portion and an upstream edge portion of the medium in the predetermined transporting direction; and a sensor positioned between the pair of sensors in side view and sensing a side edge portion of the medium.

2. A detection device comprising:

a transporter that stops transportation of a medium on which a first image is formed, the transporter restarting the transportation of the medium toward an imager after the medium has been in a stopped state, the imager forming a second image on the medium;

a detector that detects an edge portion of the medium while the medium is in the stopped state, and includes a plurality of sensing units that sense respective edge portions of the medium; and an opening-closing portion disposed at a position that is between the plurality of sensing units and at which the plurality of sensing units are not disposed, the opening-closing portion covering and uncovering an opening at which a transport path of the transporter is exposed.

3. The detection device according to claim 1, wherein the transporter is disposed at a position at which the transportation of the medium is stopped in an apparatus in which the detection device is disposed.

4. The detection device according to claim 1,
wherein the transporter stops the transportation of the medium in a first direction and restarts the transportation of the medium in a second direction after the medium has been in the stopped state, the second direction being different from the first direction.

5. The detection device according to claim 4,
wherein the first direction and the second direction are opposite to each other, and
wherein the transporter includes a transport member that transports the medium, the transporter performing the transportation in the first direction and the transportation in the second direction by changing a rotation direction of the transport member.

6. The detection device according to claim 1,
wherein the transporter includes:
a transport member disposed in an upstream region of the detection device in the predetermined transporting direction, the transport member transporting the medium; and
a support unit disposed downstream of the transport member in the predetermined transporting direction of the medium, the support unit supporting the medium.

7. The detection device according to claim 6,
wherein the support unit includes portions between which the pair of sensors are disposed in a direction crossing the predetermined transporting direction when viewed in a direction perpendicular to an image forming surface of the medium.

8. The detection device according to claim 6,
wherein the support unit presses the edge portion of the medium in the stopped state.

9. The detection device according to claim 1,
wherein a respective sensor of the pair of sensors has a longitudinal direction and a transverse direction and is disposed to cross the edge portion of the medium in the stopped state in the longitudinal direction when viewed in a direction perpendicular to an image forming surface of the medium.

10. The detection device according to claim 1,
wherein the detector includes four or more sensing units that sense respective ones of four edge portions of the medium, and
wherein each of the four or more sensing units is disposed to cross one of the four edge portions of the medium when viewed in a direction perpendicular to an image forming surface of the medium, the four edge portions including a downstream edge portion and an upstream edge portion in the predetermined transporting direction and a pair of side edge portions.

11. The detection device according to claim 1,
wherein the detector includes a plurality of sensing units, each of which senses one respective edge portion of the medium.

12. The detection device according to claim 2,
wherein the transporter is disposed at a position at which the transportation of the medium is stopped in an apparatus in which the detection device is disposed.

13. The detection device according to claim 2,
wherein the transporter stops the transportation of the medium in a first direction and restarts the transportation of the medium in a second direction after the medium has been in the stopped state, the second direction being different from the first direction.

14. The detection device according to claim 13,
wherein the first direction and the second direction are opposite to each other, and
wherein the transporter includes a transport member that transports the medium, the transporter performing the transportation in the first direction and the transportation in the second direction by changing a rotation direction of the transport member.

15. The detection device according to claim 2,
wherein the transporter stops the transportation of the medium in a predetermined transporting direction, and
wherein the transporter includes:
a transport member disposed in an upstream region of the detection device in the predetermined transporting direction, the transport member transporting the medium; and
a support unit disposed downstream of the transport member in the predetermined transporting direction of the medium, the support unit supporting the medium.

16. The detection device according to claim 15,
wherein the support unit includes portions between which the plurality of sensing units are disposed in a direction crossing the predetermined transporting direction when viewed in a direction perpendicular to an image forming surface of the medium.

17. The detection device according to claim 15,
wherein the support unit presses the edge portion of the medium in the stopped state.

18. The detection device according to claim 2,
wherein a respective sensing unit of the plurality of sensing units has a longitudinal direction and a transverse direction and is disposed to cross the edge portion of the medium in the stopped state in the longitudinal direction when viewed in a direction perpendicular to an image forming surface of the medium.

19. The detection device according to claim 2,
wherein the transporter stops the transportation of the medium in a predetermined transporting direction,
wherein the detector includes four or more sensing units that sense respective ones of four edge portions of the medium, and
wherein each of the four or more sensing units is disposed to cross one of the four edge portions of the medium when viewed in a direction perpendicular to an image forming surface of the medium, the four edge portions including a downstream edge portion and an upstream edge portion in the predetermined transporting direction and a pair of side edge portions.

20. The detection device according to claim 2,
wherein the transporter has surfaces that face respective ones of one and another sides of the medium in the stopped state and that are flat over an entire area of the medium.

* * * * *